United States Patent
Nakashima et al.

(10) Patent No.: US 9,032,396 B2
(45) Date of Patent: May 12, 2015

(54) SERVER APPARATUS, TERMINAL APPARATUS, AND APPLICATION CONTROL SYSTEM

(75) Inventors: Ken Nakashima, Osaki (JP); Norihiko Aonuma, Osaka (JP); Hitoshi Nishikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 122 days.

(21) Appl. No.: 13/703,243

(22) PCT Filed: Jun. 9, 2011

(86) PCT No.: PCT/JP2011/063292
§ 371 (c)(1),
(2), (4) Date: Dec. 10, 2012

(87) PCT Pub. No.: WO2011/155578
PCT Pub. Date: Dec. 15, 2011

(65) Prior Publication Data
US 2013/0086577 A1 Apr. 4, 2013

(30) Foreign Application Priority Data
Jun. 10, 2010 (JP) .................................. 2010-133454

(51) Int. Cl.
*G06F 9/45* (2006.01)
*G06F 9/445* (2006.01)
(Continued)

(52) U.S. Cl.
CPC ............ *G06F 8/61* (2013.01); *H04N 21/25808* (2013.01); *H04N 21/443* (2013.01); *H04N 21/6582* (2013.01); *H04W 4/003* (2013.01); *H04L 67/34* (2013.01); *H04L 67/303* (2013.01)

(58) Field of Classification Search
None
See application file for complete search history.

(56) References Cited

U.S. PATENT DOCUMENTS 6,665,868 B1 * 12/2003 Knowles et al. .............. 717/178
6,681,246 B1 1/2004 Dutta
(Continued)

FOREIGN PATENT DOCUMENTS

CN 1325072 A 12/2001
CN 101466092 A 6/2009
(Continued)

OTHER PUBLICATIONS

Venkataraman, et al., "A priority-layered approach to transport for high bandwidth-delay product networks"; 2008 ACM; [retrieved on Feb. 22, 2015]; Retrieved from Internet <URL:http://dl.acm.org/citation.cfm?id=1544012.1544026>;pp. 1-12.*

(Continued)

*Primary Examiner* — Xi D Chen
(74) *Attorney, Agent, or Firm* — Birch, Stewart, Kolasch & Birch, LLP

(57) ABSTRACT

A server apparatus, a terminal apparatus and an application control system are provided. An application managing unit (11) determines an application to be transmitted to a terminal (20) on the basis of execution capability information and terminal state information received from the terminal (20). An application transmitting unit (12) transmits the determined application and a priority record of each application to the terminal (20) through a server transmitting unit (18). An installing unit (28) installs the received application. An application executing unit (29) controls execution of the application on the basis of execution priority represented by the received priority record and controls an output of image information generated by the application on the basis of display priority represented by the received priority record.

24 Claims, 17 Drawing Sheets

| APPLICATION ID | NAME | APPLICATION TYPE | INSTALLATION PRIORITY | EXECUTION PRIORITY | DISPLAY PRIORITY |
|---|---|---|---|---|---|
| 1 | APPLICATION1 | VIDEO DELIVERY (CONTINUOUS REPRODUCTION OF VIDEO DELIVERED FROM SERVER) | 5 | 4 | 4 |
| 2 | APPLICATION2 | SNS INFORMATION DISPLAY (RECEPTION OF SNS UPDATE INFORMATION) | 3 | 3 | 2 |
| 3 | APPLICATION3 | CHANNEL 1 PROGRAM INFORMATION DISPLAY (DISPLAY OF TITLE OR CAST MEMBERS OF PROGRAM BEING BROADCASTED IN CHANNEL 1) | 2 | 2 | 3 |
| 4 | APPLICATION4 | CHANNEL 1 ADVERTISEMENT DISPLAY (DISPLAY OF ADVERTISEMENT DELIVERED BY BROADCAST PROVIDER OF CHANNEL 1) | 4 | 1 | 1 |
| 5 | APPLICATION5 | CHANNEL 2 PROGRAM INFORMATION DISPLAY (DISPLAY OF TITLE OR CAST MEMBERS OF PROGRAM BEING BROADCASTED IN CHANNEL 2) | 2 | 2 | 3 |

(51) Int. Cl.
*H04N 21/258* (2011.01)
*H04N 21/443* (2011.01)
*H04N 21/658* (2011.01)
*H04W 4/00* (2009.01)
*H04L 29/08* (2006.01)

(56) References Cited

U.S. PATENT DOCUMENTS

| | | | |
|---|---|---|---|
| 7,142,321 B2* | 11/2006 | Tomita et al. | 717/174 |
| 7,155,639 B2* | 12/2006 | Gorshenev et al. | 714/38.14 |
| 7,165,250 B2* | 1/2007 | Lyons | 717/177 |
| 7,484,207 B2* | 1/2009 | Sato | 717/174 |
| 7,502,480 B2* | 3/2009 | Baudisch et al. | 381/104 |
| 7,694,140 B1* | 4/2010 | Sachenko et al. | 713/170 |
| 7,743,115 B2* | 6/2010 | Riordan | 717/178 |
| 7,802,082 B2* | 9/2010 | Kruse et al. | 713/1 |
| 8,261,256 B1* | 9/2012 | Adler et al. | 717/178 |
| 8,495,613 B2* | 7/2013 | Smith et al. | 717/171 |
| 8,527,618 B1* | 9/2013 | Wiese | 717/177 |
| 8,667,483 B2* | 3/2014 | Coussemaeker et al. | 717/174 |
| 2002/0016166 A1 | 2/2002 | Uchida et al. | |
| 2003/0011749 A1 | 1/2003 | Kawakami et al. | |
| 2003/0074647 A1* | 4/2003 | Andrew | 717/100 |
| 2003/0093502 A1* | 5/2003 | Kurosawa et al. | 709/220 |
| 2003/0189913 A1* | 10/2003 | Kim | 370/338 |
| 2004/0023646 A1 | 2/2004 | Inami et al. | |
| 2004/0240408 A1* | 12/2004 | Gur | 370/328 |
| 2005/0055154 A1 | 3/2005 | Tanaka et al. | |
| 2005/0120387 A1 | 6/2005 | Kawakami et al. | |
| 2005/0138158 A1* | 6/2005 | Challener et al. | 709/223 |
| 2005/0251677 A1* | 11/2005 | Maeda et al. | 713/165 |
| 2005/0256614 A1* | 11/2005 | Habermas | 701/1 |
| 2006/0136893 A1* | 6/2006 | Blossom et al. | 717/168 |
| 2007/0088837 A1* | 4/2007 | Gidron et al. | 709/228 |
| 2007/0174356 A1 | 7/2007 | Horii et al. | |
| 2008/0040490 A1* | 2/2008 | Karlberg | 709/228 |
| 2008/0086370 A1* | 4/2008 | Narayanaswami et al. | 705/14 |
| 2008/0141283 A1 | 6/2008 | Minemura et al. | |
| 2008/0155534 A1* | 6/2008 | Boss et al. | 717/178 |
| 2008/0228796 A1* | 9/2008 | Angelov | 707/101 |
| 2008/0235728 A1 | 9/2008 | Kim | |
| 2009/0049500 A1* | 2/2009 | Aoki et al. | 725/131 |
| 2009/0094596 A1* | 4/2009 | Kuiper et al. | 717/174 |
| 2009/0164986 A1* | 6/2009 | Lee et al. | 717/168 |
| 2009/0300360 A1* | 12/2009 | Sakaguchi et al. | 713/171 |
| 2010/0070616 A1* | 3/2010 | Yook | 709/220 |
| 2010/0154009 A1* | 6/2010 | Del Sordo | 725/62 |
| 2011/0066960 A1* | 3/2011 | Suzuki | 715/764 |
| 2011/0271275 A1* | 11/2011 | Ochi et al. | 717/177 |
| 2011/0307884 A1* | 12/2011 | Wabe et al. | 717/178 |
| 2014/0059536 A1* | 2/2014 | Hiratsuka et al. | 717/178 |

FOREIGN PATENT DOCUMENTS

| | | |
|---|---|---|
| JP | 2002-169739 A | 6/2002 |
| JP | 2002-238003 A | 8/2002 |
| JP | 2004-5442 A | 1/2004 |
| JP | 2004-78936 A | 3/2004 |
| JP | 2004-193681 A | 7/2004 |
| JP | 2004-251738 A | 9/2004 |
| JP | 2005-75314 A | 3/2005 |
| JP | 2006-277062 A | 10/2006 |
| JP | 2008-131594 A | 6/2008 |
| JP | 2008-245275 A | 10/2008 |
| WO | WO 2005-076125 A1 | 8/2005 |
| WO | WO 2009/002999 A2 | 12/2008 |

OTHER PUBLICATIONS

Saleemi, et al., "Content Scheduling in Multimedia Interactive Mobile"; 2008 ACM; [retrieved on Feb. 22, 2015]; Retrieved from Internet <URL:http://dl.acm.org/citation.cfm?id=1496984.1497010>;pp. 152-159.*

Han, et al., "Dynamic Resource Aware Software Configuraiton for Pervasive Application"; 2006; IEEE; [retrieved on Feb. 22, 2015]; Retrieved from Internet <URL:http://ieeexplore.ieee.org/stamp/stamp.jsp?tp=&arnumber=1692159>;pp. 1-4.*

Chung, Shin, "Communicaiton and Collaboration Service Components for Ubiquitous Communication Applications"; 2013 IEEE; [retrieved on Feb. 22, 2015]; Retrieved from Internet <URL:http://ieeexplore.ieee.org/stamp/stamp.jsp?tp=&arnumber=6680988>;pp. 1372-1377.*

International Search Report issued in PCT/JP2011/063292, mailed on Aug. 9, 2011.

* cited by examiner

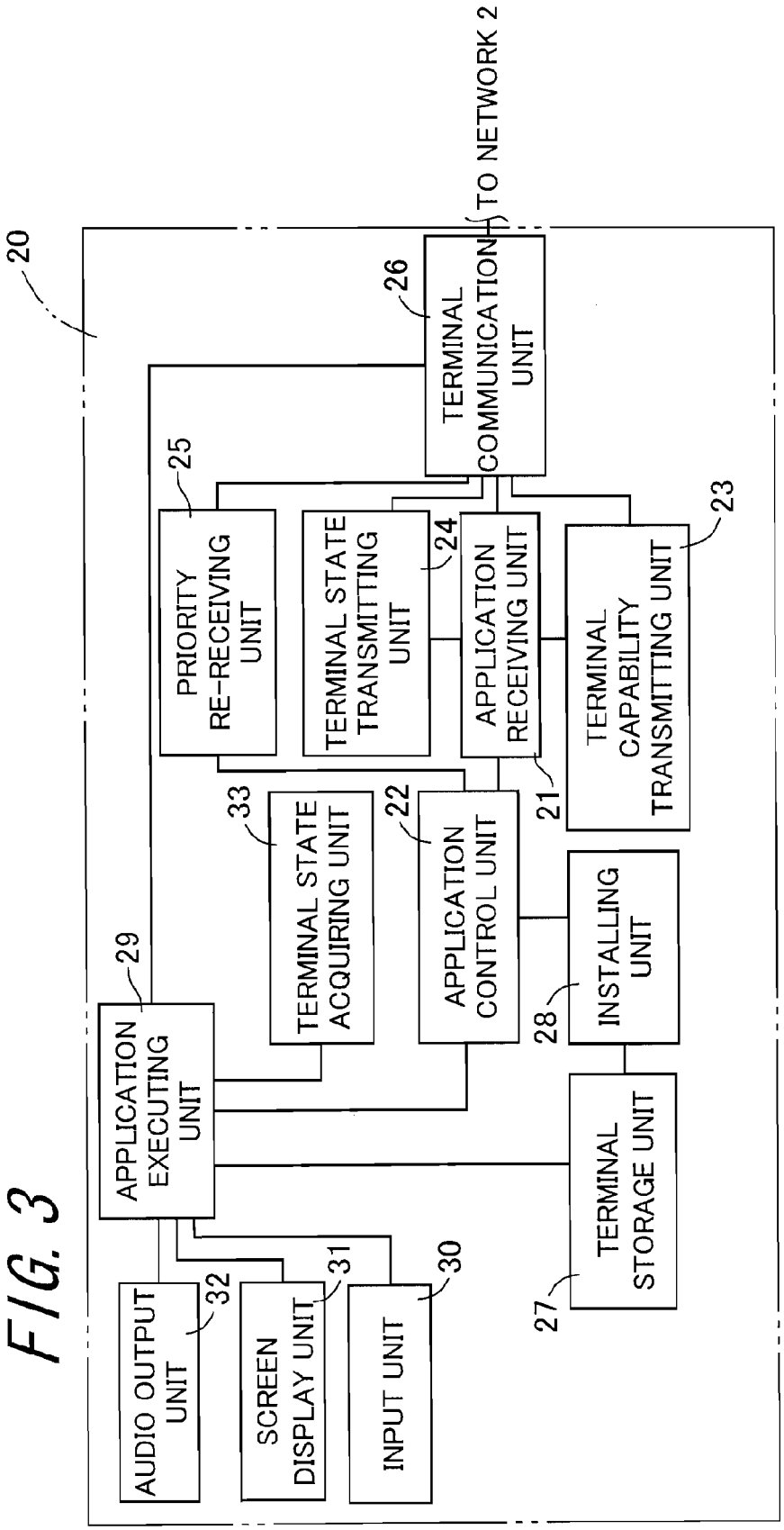

FIG. 4

| APPLICATION ID | NAME | APPLICATION TYPE | INSTALLATION PRIORITY | EXECUTION PRIORITY | DISPLAY PRIORITY |
|---|---|---|---|---|---|
| 1 | APPLICATION1 | VIDEO DELIVERY (CONTINUOUS REPRODUCTION OF VIDEO DELIVERED FROM SERVER) | 5 | 4 | 4 |
| 2 | APPLICATION2 | SNS INFORMATION DISPLAY (RECEPTION OF SNS UPDATE INFORMATION) | 3 | 3 | 2 |
| 3 | APPLICATION3 | CHANNEL 1 PROGRAM INFORMATION DISPLAY (DISPLAY OF TITLE OR CAST MEMBERS OF PROGRAM BEING BROADCASTED IN CHANNEL 1) | 2 | 2 | 3 |
| 4 | APPLICATION4 | CHANNEL 1 ADVERTISEMENT DISPLAY (DISPLAY OF ADVERTISEMENT DELIVERED BY BROADCAST PROVIDER OF CHANNEL 1) | 4 | 1 | 1 |
| 5 | APPLICATION5 | CHANNEL 2 PROGRAM INFORMATION DISPLAY (DISPLAY OF TITLE OR CAST MEMBERS OF PROGRAM BEING BROADCASTED IN CHANNEL 2) | 2 | 2 | 3 |

FIG. 5

| TERMINAL ID | INSTALLABLE APPLICATION NUMBER | SIMULTANEOUSLY-EXECUTABLE APPLICATION NUMBER | SIMULTANEOUSLY-DISPLAYABLE APPLICATION NUMBER |
|---|---|---|---|
| 01:23:45:67:89:01 | 10 | 5 | 3 |

FIG. 6

| TERMINAL STATE INFORMATION | EXECUTION TARGET APPLICATION ID |
|---|---|
| CHANNEL 1 | 1,2,3,4 |
| CHANNEL 2 | 1,2,5 |

FIG. 11

| APPLICATION ID | NAME | APPLICATION TYPE | INSTALLATION PRIORITY | EXECUTION PRIORITY | DISPLAY PRIORITY | AUDIO OUTPUT PRIORITY | INPUT RECEIVING PRIORITY | COMMUNICATION PRIORITY |
|---|---|---|---|---|---|---|---|---|
| 1 | APPLICATION1 | VIDEO DELIVERY | 5 | 4 | 4 | 3 | 0 | 4 |
| 2 | APPLICATION2 | SNS INFORMATION DISPLAY | 3 | 3 | 2 | 0 | 4 | 3 |
| 3 | APPLICATION3 | CHANNEL 1 PROGRAM INFORMATION DISPLAY | 2 | 2 | 3 | 0 | 2 | 1 |
| 4 | APPLICATION4 | CHANNEL 1 ADVERTISEMENT DISPLAY | 4 | 1 | 1 | 4 | 3 | 2 |
| 5 | APPLICATION5 | CHANNEL 2 PROGRAM INFORMATION DISPLAY | 2 | 2 | 3 | 0 | 2 | 1 |

FIG. 12

| APPLICATION ID 511 | NAME 512 | APPLICATION TYPE 513 | TARGET CONTENT 544 | REFERENCE LATITUDE 545 | REFERENCE LONGITUDE 546 | DISPLAY PRIORITY 547 | | | |
|---|---|---|---|---|---|---|---|---|---|
| | | | | | | 0~1km 547a | 1~5km 547b | 5~10km 547c | over 10km 547d |
| 1 | APPLICATION1 | ADVERTISEMENT DISPLAY OF STORE 1 | CONTENT1 | lat1 | lng1 | 5 | 4 | 3 | 0 |
| 2 | APPLICATION2 | ADVERTISEMENT DISPLAY OF STORE 2 | CONTENT1 | lat2 | lng2 | 4 | 4 | 2 | 0 |
| 3 | APPLICATION3 | ADVERTISEMENT DISPLAY OF STORE 3 | CONTENT1 | lat3 | lng3 | 5 | 3 | 3 | 0 |
| 4 | APPLICATION4 | AIRPLANE TICKET RESERVATION | CONTENT1 | lat4 | lng4 | 0 | 0 | 0 | 5 |
| 5 | APPLICATION5 | HOTEL RESERVATION | CONTENT1 | lat5 | lng5 | 2 | 2 | 2 | 4 |
| 6 | APPLICATION6 | WEATHER FORECAST | CONTENT1 | lat6 | lng6 | 1 | 1 | 1 | 1 |
| 7 | APPLICATION7 | ADVERTISEMENT DISPLAY OF STORE 4 | CONTENT2 | lat7 | lng7 | 5 | 4 | 3 | 0 |

| TERMINAL ID | SIMULTANEOUSLY-DISPLAYABLE APPLICATION NUMBER |
|---|---|
| 01:23:45:67:89:01 | 3 |

SERVER APPARATUS, TERMINAL APPARATUS, AND APPLICATION CONTROL SYSTEM

TECHNICAL FIELD

The present invention relates to a server apparatus, a terminal apparatus, and an application control system which can control execution of plural applications.

BACKGROUND ART

Application distribution services which are used to download application programs (hereinafter, referred to as "applications") on a free or non-free basis from a server apparatus (hereinafter, referred to as a "server") connected to a network have become widespread, and can be utilized with a terminal apparatus (hereinafter, referred to as "terminal") such as a portable terminal apparatus such as mobile phones, personal digital assistants (abbreviated as "PDA"), and a portable game consoles or stationary terminal apparatus such as set top boxes (abbreviated as "STB"), television receivers (hereinafter, referred to as "TV"), video recorders, and personal computers (hereinafter, referred to as "PC").

An application is a program having functions of receiving a variety of information such as news information, weather information, traffic information, photographs, videos, and information provided through a blog service or a social network service (abbreviated as "SNS") from a server via a network, controlling an input device of a terminal such as a touch panel, a keyboard, a joystick, or track ball or various sensors such as a global positioning system (abbreviated as "GPS"), an acceleration sensor, or a gyroscope, or controlling an output device of a terminal such as a display, a light emitting diode (abbreviated as "LED"), a speaker, or a vibrator. In the terminal apparatus, an application has a function of acquiring information inputted from a user through an input device or information detected by various sensors, outputting video or audio through an output device, or transmitting or receiving information to and from a server. An application is a program generated using program languages such as BASIC, C, Java (registered trademark), and JavaScript (registered trademark), multimedia contents such as Adobe Flash (registered trademark) and Adobe AIR (registered trademark), markup languages such as HTML (Hyper Text Markup Language), CSS (Cascading Style Sheet), and DOM (Document Object Model), web browser extensions such as AJAX (Asynchronous JavaScript+XML) and Microsoft Silverlight (registered trademark), web server extensions such as PHP (Hypertext Preprocessor), and image description languages such as SVG (Scalable Vector Graphic).

In an application distribution service, generally, an application selected by a user is downloaded onto a terminal apparatus from a server for use. However, when the number of applications which can be distributed through the service increases, it takes time for a user to search for an application therefrom, or the search operation is complicated. Therefore, there is a need for a technique of automatically downloading and using an appropriate application depending on conditions of the terminal apparatus or the user. For example, automatically selecting an application depending on position information of a terminal, information on a content being viewed with the terminal, or information on a user using the terminal can be considered.

An application control system described in Patent Literature 1 is known as a first related art of controlling applications between a server and a terminal apparatus. In this application control system, the terminal apparatus transmits position information to a center apparatus corresponding to the server and the center apparatus notifies the terminal apparatus of the URL of an application correlated with the position information of the terminal apparatus. The terminal apparatus acquires an application and a service policy from the application server indicated by the notified URL of the application. The service policy includes operating conditions regulated at the position and time of the terminal apparatus. The terminal apparatus controls the application on the basis of the service policy. For example, when the position of the terminal apparatus departs from an application providing area, or when a time limit has elapsed, the terminal apparatus stops the operation of the application or discards the application. When another application is newly provided, the terminal apparatus switches the application currently operating to the newly-provided application.

A broadcasting receiver described in Patent Literature 2 is known as a second related art. The broadcasting receiver assigns channel numbers of the broadcasting receiver to applications and executes an application corresponding to the selected channel number when a channel number is selected.

A portable information apparatus managing service system described in Patent Literature 3 is known as a third related art. The portable information apparatus managing service system downloads an application to the portable information apparatus in accordance with an instruction of an issuer issuing the portable information apparatus. In accordance with an adding or deleting instruction from the issuer, the portable information apparatus managing service system adds an application to the portable information apparatus or deletes an application from the portable information apparatus. Examples of this application include a point application in which points are given to a user depending on the amount of money that a user spends in purchasing items or using services and a mileage application in which a mileage is given to a user depending on the distance or the amount of money by which transportation facilities, such as airplanes, are used.

In the first related art, the number of applications which can be simultaneously executed by a terminal apparatus is only one. Therefore, when plural applications which can be used in a certain place are present, a user has to use the applications while switching between them. Since an application and the service policy thereof are simultaneously distributed, the service policy cannot be changed after the application is distributed. That is, the operation of the application cannot be changed by the server after the application is distributed. For example, a control operation of executing an application for displaying an advertisement at a specific time cannot be performed in accordance with an instruction from the server.

In the second related art, an application can be controlled by only the broadcasting receiver but cannot be controlled by a server apparatus or the like. In the third related art, plural applications can be downloaded onto a portable information apparatus but execution of the downloaded application cannot be controlled.

CITATION LIST

Patent Literature

Patent Literature 1: Japanese Unexamined Patent Publication JP-A 2008-131594
Patent Literature 2: Japanese Unexamined Patent Publication JP-A 2008-245275

Patent Literature 3: Japanese Unexamined Patent Publication JP-A 2004-5442

SUMMARY OF INVENTION

An object of the invention is to provide a server apparatus, a terminal apparatus, and an application control system which are capable of controlling execution of plural applications, which are distributed from the server apparatus to the terminal apparatus, from the server apparatus.

The invention provides a server apparatus comprising:

a storage unit configured so as to store plural application programs and priority information representing priorities for controlling the application programs in correlation with each other;

a determination unit configured so as to determine an application program to be transmitted to a terminal apparatus; and an application transmitting unit configured so as to read the application program determined by the determination unit and the priority information correlated with the determined application program from the storage unit and to transmit the read application program and the read priority information to the terminal apparatus.

According to the invention, the storage unit stores plural application programs and priority information representing priorities for controlling the application programs in correlation with each other. The determination unit determines the application program to be transmitted to the terminal apparatus. The application transmitting unit reads the application program determined by the determination unit and the priority information correlated with the determined application program from the storage unit and transmits the read application program and the read priority information to the terminal apparatus. Accordingly, it is possible to control execution of the plural applications distributed from the server apparatus to the terminal apparatus on the basis of the priority information transmitted from the server apparatus.

Further, in the invention, it is preferable that the server apparatus further comprises a terminal state receiving unit configured so as to receive terminal state information representing a state of the terminal apparatus from the terminal apparatus, and the determination unit determines the application program to be transmitted to the terminal apparatus on a basis of the terminal state information received by the terminal state receiving unit.

According to the invention, the terminal state receiving unit receives terminal state information representing a state of a terminal apparatus from the terminal apparatus. The determination unit determines the application program to be transmitted to the terminal apparatus on the basis of the terminal state information received by the terminal state receiving unit. Accordingly, it is possible to change the application program to be transmitted to the terminal apparatus depending on the state of the terminal apparatus.

Further, in the invention, it is preferable that the server apparatus further comprises a terminal capability receiving unit configured so as to receive terminal capability information representing a number of applications which can be controlled by the terminal apparatus, from the terminal apparatus, and the determination unit determines the application program to be transmitted to the terminal apparatus on a basis of the terminal capability information received by the terminal capability receiving unit.

According to the invention, the terminal capability receiving unit receives terminal capability information, representing the number of applications which can be controlled by the terminal apparatus, from the terminal apparatus. The determination unit determines the application program to be transmitted to the terminal apparatus on the basis of the terminal capability information received by the terminal capability receiving unit. Accordingly, it is possible to change the application program to be transmitted to the terminal apparatus depending on the number of applications which can be controlled by the terminal apparatus.

Further, in the invention, it is preferable that the server apparatus further comprises:

a priority changing unit configured so as to change the priorities represented by the priority information stored in the storage unit; and a priority transmitting unit configured so as to transmit the priority information changed by the priority changing unit to the terminal apparatus.

According to the invention, the priority changing unit changes the priorities represented by the priority information stored in the storage unit. The priority transmitting unit transmits the priority information changed by the priority changing unit to the terminal apparatus. Accordingly, it is possible to change the priority information transmitted to the terminal apparatus from the server apparatus.

Further, in the invention, it is preferable that the priorities represented by the priority information stored in the storage unit are priorities for installing the application programs.

According to the invention, since the priorities represented by the priority information stored in the storage unit are priorities for installing the application programs, it is possible to control the order of priorities for installing the applications in the terminal apparatus from the server apparatus.

Further, in the invention, it is preferable that the priorities represented by the priority information stored in the storage unit are priorities for executing the application programs.

According to the invention, since the priorities represented by the priority information stored in the storage unit are priorities for executing the application programs, it is possible to control the order of priorities for executing the applications in the terminal apparatus from the server apparatus.

Further, in the invention, it is preferable that the priorities represented by the priority information stored in the storage unit are priorities for displaying image information generated by the application programs.

According to the invention, since the priorities represented by the priority information stored in the storage unit are priorities for displaying image information generated by the application programs, it is possible to control the order of priorities for displaying the image information generated by the applications in the terminal apparatus from the server apparatus.

Further, in the invention, it is preferable that the priorities represented by the priority information stored in the storage unit are priorities for outputting audio information generated by the application programs.

According to the invention, since the priorities represented by the priority information stored in the storage unit are priorities for outputting audio information generated by the application programs, it is possible to control the order of priorities for outputting the audio information generated by the applications in the terminal apparatus from the server apparatus.

Further, in the invention, it is preferable that the terminal apparatus includes an input unit configured so that instruction information representing an instruction provided to an application program by a user is inputted, and the priorities represented by the priority information stored in the storage unit are priorities for assigning the input unit to the application programs.

According to the invention, the terminal apparatus includes an input unit configured so that instruction information representing an instruction provided to an application program by a user is inputted. The priorities represented by the priority information stored in the storage unit are priorities for assigning the input unit to the application programs. Accordingly, it is possible to control the order of priorities for assigning the input unit to the application programs in the terminal apparatus from the server apparatus.

Further, in the invention, it is preferable that the priorities represented by the priority information stored in the storage unit are priorities of communications performed by the application programs.

According to the invention, since the priorities represented by the priority information stored in the storage unit are priorities of communications performed by the application programs, it is possible to control the order of priorities for communications performed by the application in the terminal apparatus from the server apparatus.

Further, the invention provides a terminal apparatus comprising:

an application receiving unit configured so as to receive an application program and priority information representing a priority for controlling the application program from a server apparatus; and a control unit configured so as to control the application program received by the application receiving unit on a basis of the priority represented by the priority information received by the application receiving unit.

According to the invention, the application receiving unit receives an application program and priority information representing the priority for controlling the application program, from a server apparatus. The control unit controls the application program received by the application receiving unit on the basis of the priority represented by the priority information received by the application receiving unit. Accordingly, it is possible to control execution of the plural applications distributed from the server apparatus to the terminal apparatus on the basis of the priority information transmitted from the server apparatus.

Further, in the invention, it is preferable that the terminal apparatus further comprises a terminal state transmitting unit configured so as to transmit terminal state information representing a state of the terminal apparatus to the server apparatus.

According to the invention, the terminal state transmitting unit transmits terminal state information representing the state of the terminal apparatus to the server apparatus. Accordingly, it is possible to change the application program transmitted to the terminal apparatus depending on the state of the terminal apparatus.

Further, in the invention, it is preferable that the terminal apparatus further comprises a terminal capability transmitting unit configured so as to transmit terminal capability information representing a number of applications which can be controlled by the terminal apparatus.

According to the invention, the terminal capability transmitting unit transmits terminal capability information representing the number of applications which can be controlled by the terminal apparatus. Accordingly, it is possible to change the application program transmitted to the terminal apparatus depending on the number of applications which can be controlled by the terminal apparatus.

Further, in the invention, it is preferable that the terminal apparatus further comprises a priority receiving unit configured so as to receive changed priority information from the server apparatus after receiving the application programs and the priority information through the application receiving unit, and the control unit controls the application program received by the application receiving unit depending on the priority represented by the priority information received by the priority receiving unit.

According to the invention, the priority receiving unit receives changed priority information from the server apparatus after receiving the application program and the priority information through the application receiving unit. The control unit controls the application program received by the application receiving unit depending on the priority represented by the priority information received by the priority receiving unit. Accordingly, it is possible to change the priority information transmitted to the terminal apparatus from the server apparatus.

Further, in the invention, it is preferable that the control unit controls installing an application program and uninstalling an installed application program on a basis of the priority represented by the received priority information.

According to the invention, since the control unit controls installing an application program and uninstalling an installed application program on the basis of the priority represented by the received priority information, it is possible to control the order of priority for installing an application in the terminal apparatus from the server apparatus.

Further, in the invention, it is preferable that the control unit controls starting and ending of execution of the application program on a basis of the priority represented by the received priority information.

According to the invention, since the control unit controls starting and ending of execution of the application program on the basis of the priority represented by the received priority information, it is possible to control the order of priority for executing the application in the terminal apparatus from the server apparatus.

Further, in the invention, it is preferable that the control unit determines whether image information generated by the application program is displayed on a basis of the priority represented by the received priority information or not.

According to the invention, since the control unit determines whether image information generated by the application program is displayed on the basis of the priority represented by the received priority information or not, it is possible to control the order of priority for displaying the image information generated by an application in the terminal apparatus from the server apparatus.

Further, in the invention, it is preferable that the control unit controls a display position and a display size of image information generated by the application program on a basis of the priority represented by the received priority information.

According to the invention, since the control unit controls a display position and a display size of image information generated by the application program on the basis of the priority represented by the received priority information, it is possible to control the display position and the display size of the image information generated by the application in the terminal apparatus from the server apparatus.

Further, in the invention, it is preferable that the control unit controls an output of audio information generated by the application program on a basis of the priority represented by the received priority information.

According to the invention, since the control unit controls an output of audio information generated by the application program on the basis of the priority represented by the received priority information, it is possible to control the order of priority for outputting audio information generated by the application in the terminal apparatus from the server apparatus.

Further, in the invention, it is preferable that the terminal apparatus further comprises an input unit configured so that instruction information representing an instruction provided to the application program by a user is inputted, and the control unit controls assigning the input unit to the application program on a basis of the priority represented by the received priority information.

According to the invention, through the input unit, instruction information representing an instruction provided to the application program by a user is inputted. The control unit controls assigning the input unit to the application program on the basis of the priority represented by the received priority information. Accordingly, it is possible to control the order of priority for assigning the input unit to the application program in the terminal apparatus from the server apparatus.

Further, in the invention, it is preferable that the control unit controls communication of the application program on a basis of the priority represented by the received priority information.

According to the invention, since the control unit controls communication of the application program on the basis of the priority represented by the received priority information, it is possible to control the order of priority for communication of the application in the terminal apparatus from the server apparatus.

Further, in the invention, it is preferable that the terminal apparatus further comprises a display unit configured so as to display a video content, and the terminal state information is identification information for identifying the video content displayed on the display unit.

According to the invention, the display unit displays a video content. The terminal state information is identification information for identifying the video content displayed on the display unit. Accordingly, it is possible to receive an application program from the server apparatus depending on the video content displayed in the terminal apparatus.

Further, the invention provides an application control system comprising:

the above-mentioned server apparatus; and the above-mentioned terminal apparatus.

According to the invention, since the application control system comprises the above-mentioned server apparatus and the above-mentioned terminal apparatus, it is possible to control execution of the plural applications distributed from the server apparatus to the terminal apparatus on the basis of the priority information transmitted from the server apparatus.

Further, in the invention, it is preferable that the terminal state information includes identification information for identifying a content including document information displayed in the terminal apparatus and position information representing a position of the terminal apparatus, and the determination unit determines an application program to be transmitted to the terminal apparatus on a basis of the content including the document information which is identified by the identification information included in the terminal state information received by the terminal state receiving unit and the position represented by the position information included in the terminal state information received by the terminal state receiving unit.

According to the invention, the terminal state information includes identification information for identifying a content including document information displayed in the terminal apparatus and position information representing the position of the terminal apparatus. The determination unit determines an application program to be transmitted to the terminal apparatus on the basis of the content including the document information which is identified by the identification information included in the terminal state information received by the terminal state receiving unit and the position represented by the position information included in the terminal state information received by the terminal state receiving unit. Accordingly, the server apparatus can distribute applications to the terminal apparatus on the basis of the content displayed in the terminal apparatus and the position of the terminal apparatus, and it is thus possible to control execution of the plural applications distributed from the server apparatus to the terminal apparatus on the basis of the priority information transmitted from the server apparatus.

Further, in the invention, it is preferable that the terminal apparatus further comprises:

a display unit configured so as to displays a content including document information; and a position detecting unit configured so as to detect the position of the terminal apparatus, and the terminal state information includes identification information for identifying the content displayed on the display unit and position information representing the position detected by the position detecting unit.

According to the invention, the display unit displays a content including document information. The position detecting unit detects the position of the terminal apparatus. The terminal state information includes identification information for identifying the content displayed on the display unit and position information representing the position detected by the position detecting unit. Accordingly, the terminal apparatus can make the server apparatus distribute an application on the basis of the content displayed in the terminal apparatus and the position of the terminal apparatus.

Further, the invention provides an application control system comprising the above-mentioned server apparatus and the above-mentioned terminal apparatus.

According to the invention, since the application control system comprises the above-mentioned server apparatus and the above-mentioned terminal apparatus, the server apparatus can distribute an application to the terminal apparatus on the basis of the content displayed in the terminal apparatus and the position of the terminal apparatus, and it is thus possible to control execution of the plural applications distributed from the server apparatus to the terminal apparatus on the basis of the priority information transmitted from the server apparatus.

BRIEF DESCRIPTION OF DRAWINGS

Other and further objects, features, and advantages of the invention will be more explicit from the following detailed description taken with reference to the drawings wherein:

FIG. 3 is a block diagram illustrating the configuration of a terminal;

FIG. 4 is a diagram illustrating an example of a priority table;

FIG. 5 is a diagram illustrating an example of an execution capability table;

FIG. 6 is a diagram illustrating an example of a terminal state table;

FIG. 11 is a diagram illustrating an example of a priority table which is a modified example of the priority table;

FIG. 12 is a diagram illustrating an example of a priority table;

FIG. 13 is a diagram illustrating an example of an execution capability table;

DESCRIPTION OF EMBODIMENTS

Hereinafter, preferred embodiments of the invention will be described in detail with reference to the accompanying drawings.

Figure 1:
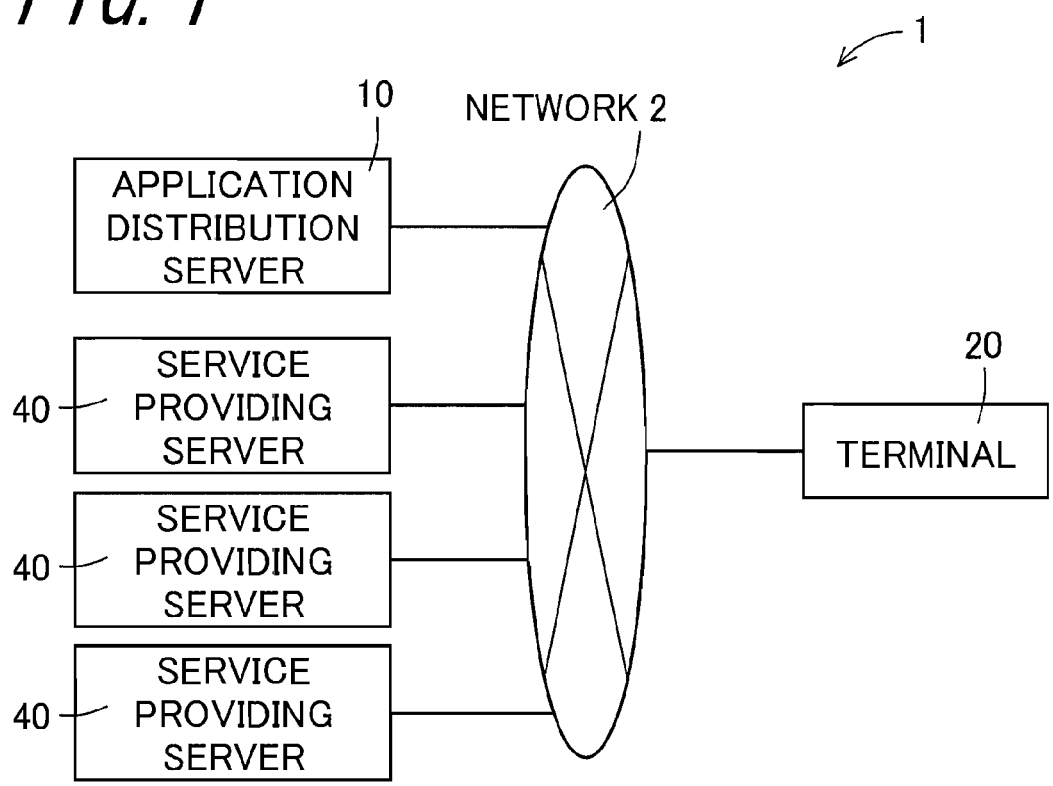
FIG. 1 is a block diagram illustrating the configuration of an application control system according to an embodiment of the invention.

FIG. 1 is a block diagram illustrating the configuration of an application control system 1 according to an embodiment of the invention. The application control system 1 includes an application distribution server (hereinafter, referred to as a "distribution server") 10, a terminal apparatus (hereinafter, referred to as a "terminal") 20, and plural service providing servers 40.

The distribution server 10, the terminal 20, and the plural service providing servers 40 are connected to a network 2, respectively. That is, the terminal 20 is connected to the distribution server 10 and the plural service providing servers 40 via the network 2. The network 2 is constructed by a network such as a local area network (abbreviated as LAN) such as a home network, a wide area network (abbreviated as WAN), or Internet. The communication type may be any of a FTTH (Fiber To The Home), an ADSL (Asymmetric Digital Subscriber Line), a mobile phone line such as a third-generation mobile phone line, Ethernet (registered trademark), a wireless LAN, and a PLC (Power Line Communications). These types may be combined.

The distribution server 10, which is a server apparatus, is a server of a provider providing an application delivery service. Applications developed by an application developer who develops an application program (hereinafter, referred to as "application") are registered in the distribution server 10. The application developer may be an individual or a company. The distribution server 10 can simultaneously distribute registered applications to plural terminals 20. In FIG. 1, only one distribution server 10 is shown, but the number of distribution servers 10 is not limited to one and may be two or more. When the number of distribution servers 10 is two or more, a user of the terminal 20 may determine the distribution server 10 from which an application will be distributed, or the terminal 20 may automatically determine the distribution server 10 from which an application will be distributed on the basis of a predetermined rule.

Examples of the terminal 20 as a terminal apparatus include a television set (hereinafter, referred to as "TV"), an electronic signage apparatus such as a digital signage apparatus, a mobile phone, a set top box (STB), a video recorder, a personal computer (hereinafter, referred to as "PC"), a personal digital assistant (PDA), a digital photo frame, a generated power monitor, that is, an apparatus displaying the electric energy generated at a home using a solar panel or the like, an electronic book reader, and an electronic dictionary.

Hereinafter, an example where the terminal 20 is a TV will be described as a first example with reference to FIGS. 1 to 11.

The terminal 20 receives television broadcasts, displays received image information, outputs received audio information, and executes an application distributed from the distribution server 10. The application executed in the terminal 20 accesses the service providing server 40 and acquires information if necessary. Some applications may not access the service providing server 40. The terminal 20 is connected to the Internet via a router and a network of an Internet service provider (ISP), which are not shown, by the use of the communication standard Ethernet (registered trademark), details of which will not be described. The terminal 20 has only to be connected to the servers via any network, and the network 2 may be a combination of networks constructed by plural types. In FIG. 1, only one terminal 20 is shown, but the number of terminals 20 is not limited to one and may be two or more.

The service providing server 40 includes, for example, a video delivery server, a social network service (SNS) server, a news delivery server, or the like, and is a server that provides information requested by an application executed in the terminal 20. The service providing server 40 may be configured to provide information to applications from service providing servers 40 that are different depending on the types of the applications, or may be configured to provide information to plural types of applications from a single service providing server 40.

Figure 2:
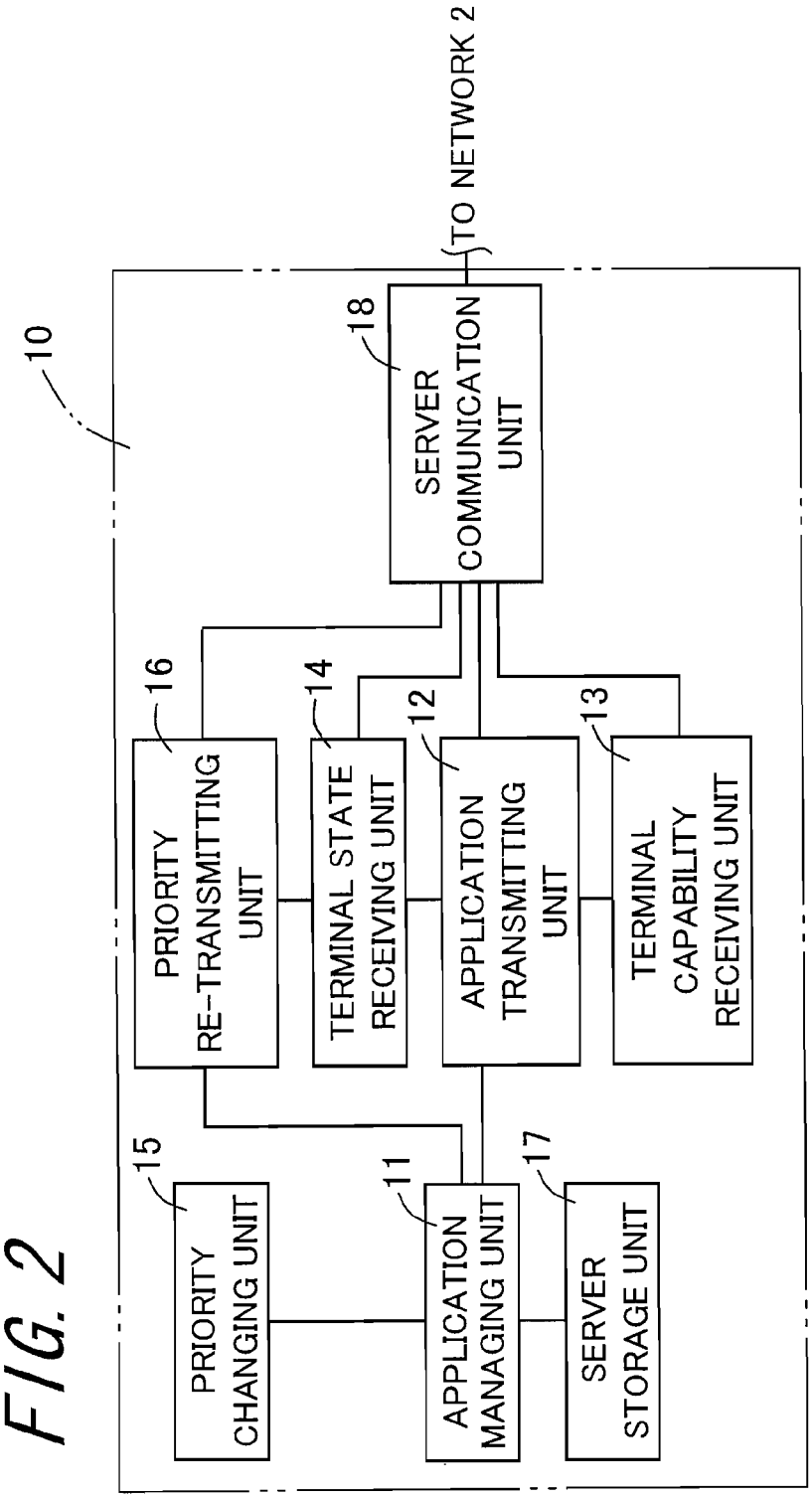
FIG. 2 is a block diagram illustrating the configuration of a distribution server.

FIG. 2 is a block diagram illustrating the configuration of the distribution server 10. The distribution server 10 includes a central processing unit (hereinafter, referred to as a "server CPU") (not shown), an application managing unit 11, an application transmitting unit 12, a terminal capability receiving unit 13, a terminal state receiving unit 14, a priority changing unit 15, a priority re-transmitting unit 16, a server storage unit 17, and a server communication unit 18. The distribution server 10 may include an input device (not shown) such as a keyboard used to input information, and may include a recording medium reader (not shown) having a removable recording medium mounted thereon and reading information from the mounted recording medium in addition to the input device.

The server CPU controls the server communication unit 18 by executing a program stored in the server storage unit 17, and realizes the functions of the application managing unit 11, the application transmitting unit 12, the terminal capability receiving unit 13, the terminal state receiving unit 14, the priority changing unit 15, the priority re-transmitting unit 16, and the like.

The application managing unit 11 manages registration of an application. Specifically, the application managing unit 11 registers an execution file of an application by storing an application and priority information inputted from the input device through a manager's operation, an application and priority information read by the recording medium reader, or an application and priority information acquired from another device connected to the network 2 by the server communication unit 18 in the server storage unit 17. The manager is a manager of the distribution server 10 or a developer of the application. The priority information is information representing priorities, that is, the order of priority, for controlling the applications and details thereof will be described later.

When storing an application in the server storage unit 17, the application managing unit 11, which is the determination unit, stores the priority information for each application in a priority table to be described later in correlation with identification information (hereinafter, referred to as "application ID (Identifier)") for identifying the application. When an instruction to delete a registered application is inputted, for example, from the input device by the manager's operation, the application managing unit 11 deletes the instructed application and the priority information correlated with the application from the server storage unit 17.

The application transmitting unit 12 reads an application from the server storage unit 17 and transmits the read application to a terminal 20 via the server communication unit 18. The application transmitting unit 12 stores the application ID of the transmitted application in the server storage unit 17 for each terminal 20. The application ID stored in the server storage unit 17 is used to transmit changed priority information.

The terminal capability receiving unit 13 receives execution capability information, which is terminal capability information transmitted from a terminal 20, via the server communication unit 18 and stores the received execution capability information in the server storage unit 17 in correlation with the terminal 20. The execution capability information is information representing the number of applications which can be controlled by the terminal 20 and details thereof will be described later. The terminal state receiving unit 14 receives terminal state information transmitted from a terminal 20 via the server communication unit 18 and stores the received terminal state information in the server storage unit 17 in correlation with the terminal 20. The terminal state information is information representing the state of the terminal 20 and details thereof will be described later.

When an instruction to change the priority of a registered application is inputted, for example, from the input device by the manager's operation or when the instruction is inputted from another device via the network 2 by the manager's operation, the priority changing unit 15 stores the priority information representing the instructed changed priority in the priority table to be described later in correlation with the application ID of the application of which the priority is instructed to change and update the priority information stored in the priority table. The priority changing unit 15 sends the application ID of the application, the priority of which is changed, to the priority re-transmitting unit 16.

When the application ID of the application of which the priority is changed is received from the priority changing unit 15, the priority re-transmitting unit 16, which is the priority transmitting unit, reads the priority information correlated with the received application ID from the server storage unit 17 and transmits the read priority information along with the application ID of the application correlated with the priority information, to the terminal 20 to which the application is distributed, via the server communication unit 18.

The server storage unit 17 is constructed by a memory device such as a hard disk drive (HDD) or a flash memory. The server storage unit 17 stores a program to be executed by the server CPU and information necessary for causing the server CPU to execute the program. The information stored in the server storage unit 17 is written and read by the server CPU. In the example shown in FIG. 2, the server storage unit 17 is included in the distribution server 10, but does not have to be included in the distribution server 10 and may be installed in a server connected to the network 2.

Examples of the program stored in the server storage unit 17 which is the storage unit include control programs controlling the server communication unit 18 and realizing various functions, applications registered through the input device or the like, and an operating system program (hereinafter, referred to as an "OS of the distribution server 10") controlling the execution of the control programs and the applications. The applications and the OS of the distribution server 10 are programs based on the related art. The information necessary for causing the server CPU to execute the program includes information used to charge a fee to a user having downloaded an application and information stored in a priority table, an execution capability table, and a terminal state table to be described later.

The server communication unit 18 communicates with a terminal 20 via the network 2. The server communication unit 18 communicates with the terminal 20, for example, using the Internet protocol (IP) and transmits and receives information. The server communication unit 18 transmits the information received from the server CPU to the terminal 20 and sends the information received from the terminal 20 to the server CPU.

FIG. 3 is a block diagram illustrating the configuration of a terminal 20. The terminal 20 includes an application receiving unit 21, an application control unit 22, a terminal capability transmitting unit 23, a terminal state transmitting unit 24, a priority re-receiving unit 25, a terminal communication unit 26, a terminal storage unit 27, an installing unit 28, an application executing unit 29, an input unit 30, a screen display unit 31, an audio output unit 32, a terminal state acquiring unit 33, and hardware (not shown).

The application executing unit 29 includes a central processing unit (hereinafter, referred to as a "terminal CPU") (not shown) and a memory (not shown). The memory (not shown) is a temporary storage memory. The terminal CPU realizes the application executing unit 29 by executing an operating system program (hereinafter, referred to as an "OS of the terminal 20") stored in the terminal storage unit 27. The OS of the terminal 20 is a program based on the related art.

The application executing unit 29 controls the terminal communication unit 26, the input unit 30, the screen display unit 31, the audio output unit 32, and the hardware (not shown), realizes the functions of the application receiving unit 21, the application control unit 22, the terminal capability transmitting unit 23, the terminal state transmitting unit 24, the priority re-receiving unit 25, the installing unit 28, and the like, and controls the execution of applications, by executing the program stored in the terminal storage unit 27.

The program stored in the terminal storage unit 27 includes control programs controlling the terminal communication unit 26, the input unit 30, the screen display unit 31, the audio output unit 32, and the hardware (not shown) and realizing various functions, applications distributed from the distribution server 10, and the OS of the terminal 20.

The OS of the terminal 20 controls the hardware of the terminal 20 and software programs (hereinafter, referred to as "software") such as applications executed by the terminal CPU, manages information thereon, and can acquire the information thereon from the hardware and the software. For example, when the terminal 20 is a TV, the OS of the terminal 20 can acquire a variety of information such as channel number information representing a number of a channel (hereinafter, referred to as a "channel number") being currently watched, application control information such as the number of applications which can be installed, the number of applications which can be simultaneously executed, and the number of applications which can be simultaneously displayed, apparatus information such as a model number and a fabrication number, network information such as a media access control (MAC) address and an IP address, power state information, external input information representing a selected external input such as an HDMI (High-Definition Multimedia Interface) or a D terminal, and volume information representing a set volume. When the terminal 20 is a mobile phone, the OS of the terminal can acquire a variety of information such as power state information, position information representing a position of the mobile phone such as a position based on a global positioning system (GPS), call state information representing a call state, communication state information representing a communication state such as packet communication, apparatus information such as the model number of the terminal, the fabrication number, the phone number of the terminal, and the E-mail address of the terminal, network information, user information such as account information of various services, and phonebook information such as names, phone numbers, and E-mail addresses registered in a phonebook.

The application receiving unit 21 receives application and priority information transmitted from the distribution server 10 via the terminal communication unit 26 and stores the received application and the received priority information in the terminal storage unit 27 in correlation with each other. The application control unit 22 controls the application on the basis of the priority represented by the priority information stored in the terminal storage unit 27. The terminal capability transmitting unit 23 creates execution capability information on the basis of the application control information acquired by the OS of the terminal 20 and transmits the created execution capability information to the distribution server 10 via the terminal communication unit 26. The terminal state transmitting unit 24 creates terminal state information on the basis of the channel number information acquired by the OS of the terminal 20 and transmits the created terminal state information to the distribution server 10 via the terminal communication unit 26.

The priority re-receiving unit 25, which is the priority receiving unit, receives the priority information and the application ID, which are transmitted via the server communication unit 18 from the priority re-transmitting unit 16 of the distribution server 10, via the terminal communication unit 26. The priority re-receiving unit 25 updates the priority information correlated with the application of the received application ID out of the priority information stored in the terminal storage unit 27 with the received priority information, and notifies the application executing unit 29 of the fact of changing the priority and the application ID.

The terminal communication unit 26 communicates with the distribution server 10 and the service providing server 40 via the network 2. The server communication unit 18 communicates with the distribution server 10 and the service providing server 40, for example, using the Internet protocol (IP) and transmits and receives information to and from each of the servers. The terminal communication unit 26 transmits information received from the terminal CPU to the distribution server 10 or the service providing server 40, and sends the information received from the distribution server 10 or the service providing server 40 to the terminal CPU.

The terminal storage unit 27 is constructed by a memory device such as an HDD or a flash memory. The terminal storage unit 27 stores the above-mentioned program executed by the terminal CPU and information necessary for causing the terminal CPU to execute the program. The information necessary for causing the terminal CPU to execute the program includes the above-mentioned priority information and a setting file necessary for executing an application. The information stored in the terminal storage unit 27 is written and read by the terminal CPU.

The installing unit 28 stores an execution file of the application, which is received via the terminal communication unit 26 by the application receiving unit 21, in the terminal storage unit 27, that is, installs the received application, and uninstalls an unnecessary application. The installing unit 28 may authenticate an application to determine whether the application to be installed is an improper application such as computer viruses or spyware and may be not to install an improper application, if necessary. The authentication of an application is based on the related art, such as including data identifying an application developer in the execution file of the application. The installing unit 28 may charge a fee for an application. By causing a user to perform user registration for the distribution server 10 in advance and transmitting user information from the terminal 20 to the distribution server 10 at the time of downloading an application, the user downloading the application is specified by the distribution server 10 and a fee for the application is collected from the user. This is based on the related art. The installing unit 28 and the application executing unit 29 correspond to the control unit.

The input unit 30 is constructed by an input device such as a keyboard, a mouse, a remote controller, various sensors such as a GPS, an acceleration sensor, and a gyroscope, and sends input information to the terminal CPU. In the example shown in FIG. 3, the input unit 30 is included in the terminal 20, but does not have to be included in the terminal 20 and may be an external input device connected to the terminal 20.

The screen display unit 31 as the display unit is constructed by a display device such as a liquid crystal display (LCD), a cathode ray tube (CRT), an organic EL (electroluminescence) display, or a light emitting diode (LED) display, and displays image information received from the terminal CPU. In the example shown in FIG. 3, the screen display unit 31 may be included in the terminal 20, but does not have to be included in the terminal 20 and may be an external display device connected to the terminal 20. The audio output unit 32 is constructed by an output device such as a speaker or an earphone, and outputs audio information received from the terminal CPU. In the example shown in FIG. 3, the audio output unit 32 is included in the terminal 20, but does not have to be included in the terminal 20 and may be an external output device connected to the terminal 20.

The terminal state acquiring unit 33, which is the position detecting unit, has a GPS function, detects the latitude and longitude of the position of the terminal 20, and detects a channel being presently watched, that is, a channel selected for present watching. The OS of the terminal 20 can acquire latitude and longitude information representing the latitude and longitude of the position of the terminal 20 or channel information representing a channel being presently watched from the terminal state acquiring unit 33. The latitude and longitude information corresponds to the position information.

FIG. 4 is a diagram illustrating an example of the priority table 51. The priority table 51 is a table stored in the server storage unit 17 of the distribution server 10. The priority table 51 stores the priority information representing the priority for executing an application in correlation with the application ID of the corresponding application.

The priority table 51 includes an application ID column 511, a name column 512, an application type column 513, an installation priority column 514, an execution priority column 515, and a display priority column 516. Hereinafter, each row, that is a set of information including the application ID column 511, the name column 512, the application type column 513, the installation priority column 514, the execution priority column 515, and the display priority column 516, is referred to as a "priority record".

The application ID column 511 is a column representing identification information (hereinafter, referred to as an "application ID") for identifying an application. The distribution server 10 assigns a unique application ID to each application. The name column 512 is a column representing a name given to each application. The application type column 513 is a column representing the type of each application. The installation priority column 514 is a column representing the order of priority for installing each application in the terminal 20. The execution priority column 515 is a column representing the priority for causing the terminal 20 to execute each application. The display priority column 516 is a column representing the priority for causing the terminal 20 to display image information created by each application.

The name column 512 and the application type column 513 are reference information and are not essential. Each priority is marked, for example, by an integer of "0" to "5", and a larger numeral indicates a higher priority. In this embodiment, the highest priority is set to "5", but is not limited to this value and the priority value may be set to "6" or more. Here, when the priority value is "0", it indicates that no process is necessary for each priority. For example, when the display priority is "0", it indicates that the corresponding application does not need a display process and the process of the application is performed in the background. A specific example thereof is an application downloading data.

The installation priority column 514, the execution priority column 515, and the display priority column 516 are determined and registered by a developer of an application when the developer of the application registers the application in the distribution server 10. Each priority is determined, for example, depending on a registration fee which is paid to a manager of the distribution server 10 by the developer of the application.

In the priority table 51 shown in FIG. 4, five application IDs "1" to "5" are marked in the application ID column 511. In the name column 512, the application type column 513, the installation priority column 514, the execution priority column 515, and the display priority column 516 corresponding to each application ID, "Application 1", "Video delivery (successive reproduction of video delivered from a server)", "5", "4", and "4" are recorded respectively for the application ID "1". For the application ID "2", "Application 2", "SNS information display (reception of SNS update information)", "3", "3", and "2" are recorded respectively. For the application ID "3", "Application 3", "Channel 1 program information display (display of the title or cast members of a program broadcasted in Channel 1)", "2", "2", and "3" are recorded respectively. For the application ID "4", "Application 4", "Channel 1 advertisement display (display of an advertisement delivered by the broadcast provider of Channel 1)", "4", "1", and "1" are recorded respectively. For the application ID "5", "Application 5", "Channel 2 program information display (display of the title, cast members, and the like of a program broadcasted in Channel 2)", "2", "2", and "3" are recorded respectively.

When the priorities of applications are the same, which one has priority is determined as follows. For example, the application having the larger total value of the other priorities is determined to have higher priority. Which one has priority is not limited to this method, but another method may be used. Alternatively, which one has priority may be selected by a user of the terminal 20.

FIG. 5 is a diagram illustrating an example of the execution capability table 52. The execution capability table 52 is a table stored in the server storage unit 17 of the distribution server 10. The execution capability table 52 stores execution capability information representing execution capability of each application in the terminal 20, that is, execution capability information representing the number of applications capable of being simultaneously controlled when controlling the applications, for each terminal 20.

The execution capability table 52 includes a terminal ID column 520, an installable application number column 521, a simultaneously-executable application number column 522, and a simultaneously-displayable application number column 523. The terminal ID column 520 is a column representing identification information (hereinafter, referred to as a "terminal ID") used for the distribution server 10 to identify the terminal 20, and a MAC address is used herein. In this embodiment, a MAC address is used as the terminal ID, but the terminal ID is not limited to the MAC address and information capable of identifying the terminal 20 can be used. For example, an IP address may be used. The installable application number column 521 is a column representing the maximum number of applications capable of being simultaneously installed in a single terminal 20. The installed applications are applications in an executable state.

The simultaneously-executable application number column 522 is a column representing the maximum number of applications capable of being simultaneously executed by a single terminal 20 out of the installed applications. When the number of applications being executed reaches the number of simultaneously-executable applications, an application which is installed but which has a low execution priority is not executed. The maximum number of simultaneously-executable applications is determined depending on a process managing algorithm in the terminal CPU, performance such as a calculation speed of the terminal CPU, and memory performance such as reading and writing capability of the memory included in the terminal CPU and the terminal storage unit 27.

The simultaneously-displayable application number column 523 is a column representing the maximum number of applications which can simultaneously display information outputted from the applications on a screen out of the applications being simultaneously executed in a single terminal 20. When the number of applications outputting information out of the applications being executed reaches the number of simultaneously-displayable applications, image information created by an application outputting information but having a low display priority is not displayed. An application not outputting information can be executed in the background and is not limited by the number of simultaneously-displayable applications. The number of simultaneously-displayable applications corresponds to the number of application display areas to be described later.

In the execution capability table 52 shown in FIG. 5, the terminal ID column 520, the installable application number column 521, the simultaneously-executable application number column 522, and the simultaneously-displayable application number column 523 for a single terminal 20 are shown. The terminal ID column 520 records "01:23:45:67:89:01", the installable application number column 521 records "10", the simultaneously-executable application number column 522 records "5", and the simultaneously-displayable application number column 523 records "3".

FIG. 6 is a diagram illustrating an example of the terminal state table 53. The terminal state table 53 is a table stored in the server storage unit 17 of the distribution server 10. The terminal state table 53 is a table representing applications to be executed depending on the state of a terminal 20 and is installed for each terminal 20.

The applications capable of being executed by a terminal 20 vary depending on the state of the terminal 20. For example, when a user watches a program on Channel 2, that is, when the terminal 20 is in a state where Channel 2 is selected, that is, tuned, the execution of an application acquiring and displaying information of a program being broadcasted on Channel 1 is not helpful to the user. Therefore, the applications to be executed are determined depending on the channel number, and the terminal state table 53 is a table in which the channel number and the applications to be executed are correlated with each other.

The terminal state table 53 includes a terminal state information column 531 and an execution target application ID column 532. The terminal state information column 531 is a column representing terminal state information. The terminal state information is information representing the state of a terminal 20 and is, for example, information representing the channel number selected by a single terminal 20. The application ID column 532 is a column representing the application ID of an execution target application depending on the state of the terminal 20 recorded in the terminal state information column 531.

Among applications, some applications do not depend on the state of the terminal 20, that is, the selected channel. For example, an application displaying news or a weather forecast is an application providing information useful to the user even when any channel is presently watched, that is, when any channel is selected. The application ID of the application does not depend on the state of the terminal 20 and is registered in any application ID column 532.

When new terminal state information is received from the terminal 20, the state of the terminal 20 represented by the received terminal state information varies, that is, the number of a channel being watched varies, and thus the distribution server 10 instructs the terminal 20 as a transmission source of the new terminal state information to exclude, from the execution target, an application of which the application ID is not included in the application ID column 532 corresponding to the changed channel number out of the applications corresponding to the non-changed channel number.

The terminal state table 53 shown in FIG. 6 includes the terminal state information column 531 and the execution target application ID column 532 for a single terminal 20. The terminal state information column 531 records "Channel 1" and "Channel 2". The application ID column 532 records "1, 2, 3, 4" in correlation with "Channel 1" and "1, 2, 5" in correlation with "Channel 2".

Figure 7:
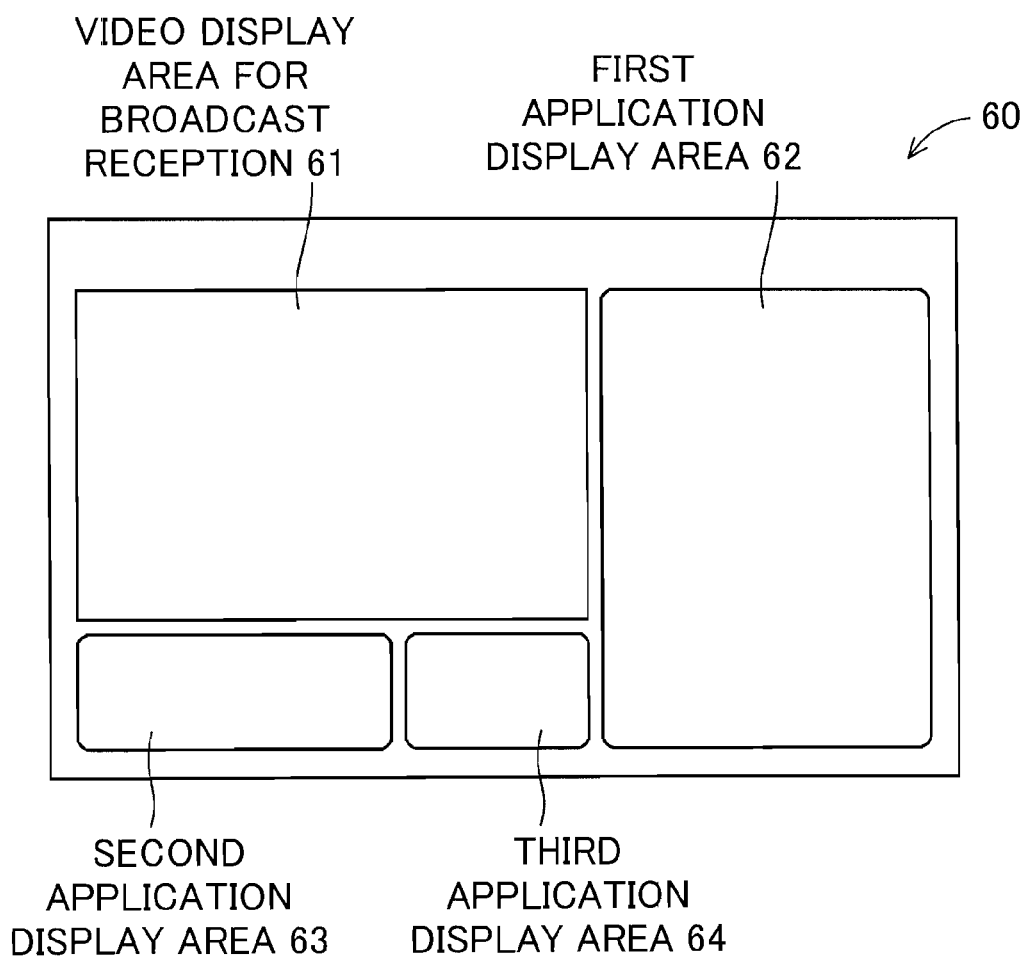
FIG. 7 is a diagram illustrating an example of a TV screen displayed on a screen display unit.

FIG. 7 is a diagram illustrating an example of a TV screen 60 displayed on the screen display unit 31. The TV screen 60 is divided, for example, into a video display area 61 receiving broadcast and plural application display areas. For example, in FIG. 7, the plural application display areas include three areas of a first application display area 62, a second application display area 63, and a third application display area 64. The number of application display areas and the assignment of the areas are not particularly limited, and may be changed, for example, in accordance with an instruction from the distribution server 10, an instruction from the service providing server 40, an instruction from a server (not shown) run by a vendor of the terminal 20, or an instruction provided through the input device of the terminal 20 by a user. If necessary, the video display area 61 receiving broadcast may be removed and the overall area of the TV screen 60 may be assigned to the application display areas. On the contrary, the application display areas may be removed and the overall area of the TV screen 60 may be assigned to the video display area 61 receiving broadcast.

In the TV screen 60 shown in FIG. 7, the first application display area 62, the second application display area 63, and the third application display area 64 are prioritized. The prioritization is determined in advance at the time of shipment or the like on the basis of the positions of display areas easily attracting a user's attention, the sizes of display areas, the number of colors which can be displayed, and the like. This prioritization may be changed in accordance with an instruction from the distribution server 10, an instruction from the service providing server 40, an instruction from a server (not shown) run by a vendor of the terminal 20, or an instruction provided through the input device of the terminal 20 by a user.

An application having a higher display priority in the priority table 51 shown in FIG. 4 is assigned to an application display area having a higher priority. The number of application display areas is transmitted as the number of simultaneously-displayable applications of the execution capability information to the distribution server 10 from the terminal 20.

In the TV screen 60 shown in FIG. 7, an example where the prioritization, that is, the determination of priorities, is performed on the basis of the sizes of the application display areas is shown. That is, the first application display area 62 which is the largest display area has the highest priority, the second application display area 63 which is the second largest display area has the second highest priority, and the third application display area 64 which is the smallest display area has the third highest priority. In this embodiment, the priorities, that is, the order of priorities, are determined on the basis of only the sizes of display areas, but the order of priorities may be determined on the basis of the display positions. For example, when the display areas are vertically arranged, it is thought that the display area located on the upper side in the vertical direction is more conspicuous for a user. Accordingly, it can be considered that the order of priorities becomes lower from the top.

Figure 8:
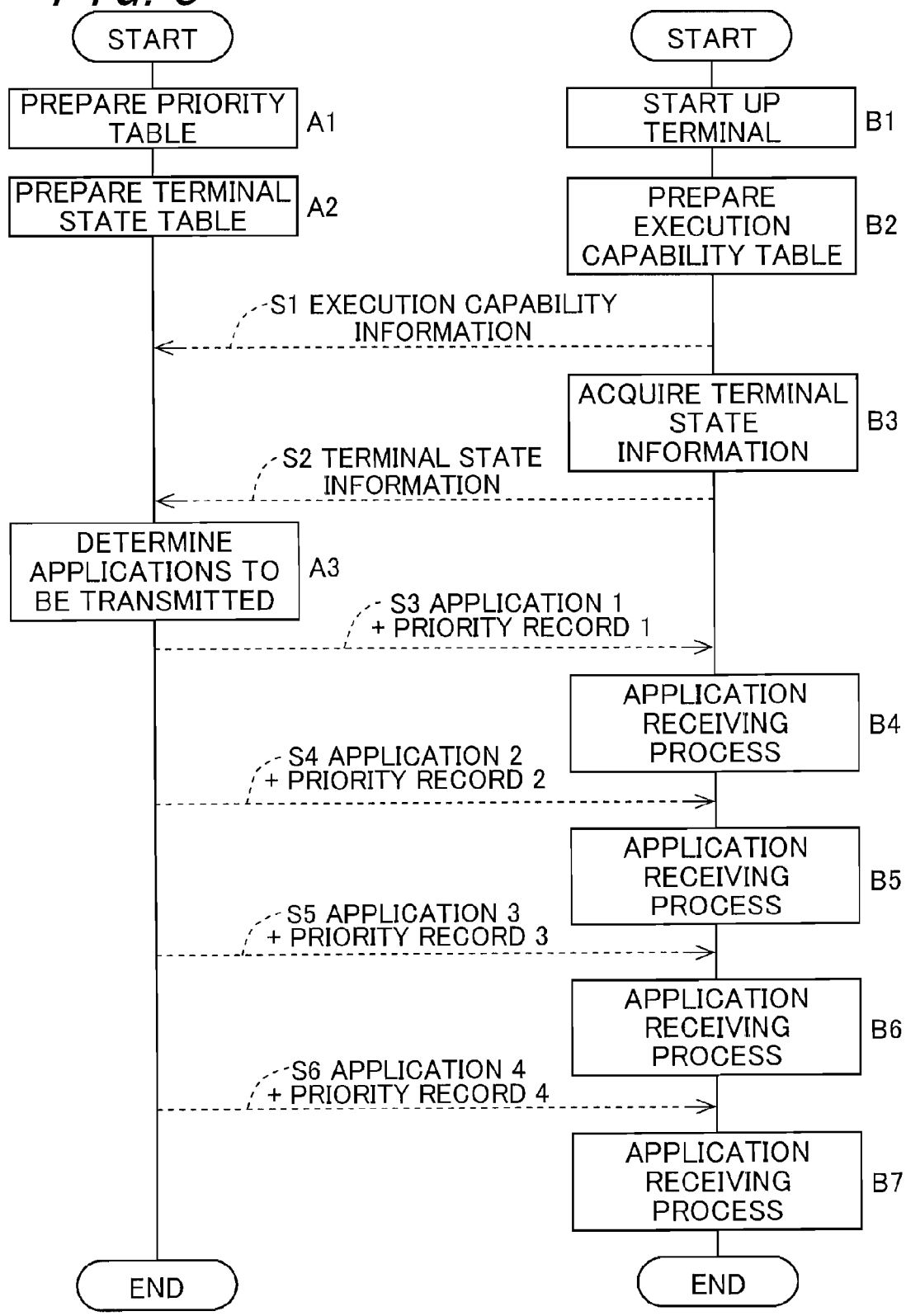
FIG. 8 is a sequence diagram illustrating the process flow of an application distributing process performed by the distribution server and the terminal.

FIG. 8 is a sequence diagram illustrating the process flow of an application distributing process performed by the distribution server 10 and the terminal 20. The left process flow in FIG. 8 shows the process flow of the application distributing process performed by the server CPU, and the right process flow shows the process flow of the application executing process performed by the terminal CPU. When the distribution server 10 is powered on and is changed to an operable state, the process flow goes to step A1. When the terminal 20 is powered on and is changed to an operable state, the process flow goes to step B1. Hereinafter, in FIGS. 8 to 10, transmission and reception of information between the distribution server 10 and the terminal 20 will be described with sequence numbers added thereto. The process flow of the distribution server 10 will be first described and then the process flow of the terminal 20 will be described.

In step A1, the application managing unit 11 prepares a priority table 51. Specifically, the application managing unit 11 prepares a priority table on the basis of application information stored in the server storage unit 17. The application information includes information on developers of applications, for example, information such as developer ID which is identification information for identifying developers, and information such as an application ID, an application name, an application type, a channel number for executing an application, an installation priority, an execution priority, and a display priority. This information is information stored (hereinafter, also referred to as "saved") in the server storage unit 17 at the same time as registering the application. The application ID is an ID which is assigned to each application by the distribution server 10 when registering the application, and it can be considered that a unique value is assigned to the application, for example, by adding "1" thereto whenever an application is registered. The information on the channel numbers assigned to broadcast stations is saved in advance in the server storage unit 17 at the time of shipment and is referred to for preparation of the priority table 51.

In step A2, the application managing unit 11 prepares a terminal state table 53. Specifically, the application managing unit 11 prepares the terminal state table 53 on the basis of the application information stored in the server storage unit 17. In sequence S1 after step A2, the terminal capability receiving unit 13 receives execution capability information from the terminal 20 through the server communication unit 18, and stores the received execution capability information as the execution capability table 52 in the server storage unit 17. It is assumed that information such as the IP address of the distribution server 10 is saved in the terminal 20 in advance and the terminal 20 can access the distribution server 10 via the network 2. The information such as the IP address of the distribution server 10 is saved at the time of shipment of the terminal 20 or is saved when a user inputs the information. This is based on the related art. In sequence S2, the terminal state receiving unit 14 receives the terminal state information from the terminal 20 through the server communication unit 18 and stores the received terminal state information in the server storage unit 17.

In step A3, the application managing unit 11 determines an application to be transmitted. Specifically, the application managing unit 11 determines an application to be transmitted to the terminal 20, which has transmitted the execution capability information and the terminal state information received by the server communication unit 18, on the basis of the execution capability information and the terminal state information received from the terminal 20 through the server communication unit 18. In a subsequent sequence after step A3, the application transmitting unit 12 sequentially transmits the application determined by the application managing unit 11 and the priority record, that is, the priority information, of the application ID of the application to the terminal 20 through the server communication unit 18 in the ascending order of the application IDs, and ends the application distributing process.

For example, when the received terminal state information represents a state where Channel 1 is selected, the application managing unit 11 determines applications of which the application IDs are "1", "2", "3", and "4" as the applications to be transmitted from the terminal state table 53. When the received execution capability information represents, for example, details of the execution capability table 52 shown in FIG. 5, the number of installable applications is "10" and thus the four determined applications can be simultaneously installed in the terminal 20. Since the number of executable applications is "5", all the four determined applications are simultaneously executable in the terminal 20. The number of displayable applications is "3" which is smaller than the number of determined applications "4", any of the display priorities are not "0", and thus the applications need to be displayed but can be installed. Accordingly, all the four determined applications are transmitted to the terminal 20.

In sequence S3 after step A3, the application transmitting unit 12 transmits the execution file of the application with an application ID of "1" and the priority record corresponding to the application ID of "1" to the terminal 20 through the server communication unit 18. Subsequently, in sequence S4, the application transmitting unit 12 transmits the execution file of the application with an application ID of "2" and the priority record corresponding to the application ID of "2" to the terminal 20 through the server communication unit 18. Subsequently, in sequence S5, the application transmitting unit 12 transmits the execution file of the application with an application ID of "3" and the priority record corresponding to the application ID of "3" to the terminal 20 through the server communication unit 18. Subsequently, in sequence S6, the application transmitting unit 12 transmits the execution file of the application with an application ID of "4" and the priority record corresponding to the application ID of "4" to the terminal 20 through the server communication unit 18, and ends the application distributing process. The application transmitting unit 12 stores the application IDs and the priority records of the transmitted applications in the server storage unit 17 in correlation with each other.

In step B1, the terminal CPU is started up. In step B2, the terminal capability transmitting unit 23 creates execution capability information. Specifically, the terminal capability transmitting unit 23 creates the execution capability information on the basis of the application control information stored in the terminal storage unit 27. As described above, the application control information is information such as the number of installable applications, the number of simultaneously-executable applications, and the number of simultaneously-displayable applications stored in the terminal storage unit 27 by the OS of the terminal 20. In sequence S1 after step B2, the terminal capability transmitting unit 23 transmits the created execution capability information to the distribution server 10 through the terminal communication unit 26.

In step B3, the terminal state transmitting unit 24 creates terminal state information. Specifically, the terminal state transmitting unit 24 creates the terminal state information on the basis of the channel number information acquired by the OS of the terminal 20. As described above, the channel number information is information representing the number of the channel over which the program being presently watched by the user is received, that is, the number of the channel being presently selected, and which is managed by the OS of the terminal 20. In sequence S2 after step B3, the terminal state transmitting unit 24 transmits the created terminal state information to the distribution server 10 through the terminal communication unit 26. Image information of the program being presently watched by the user, that is, the television broadcast displayed on the screen display unit 31, is a video content and the channel number information is identification information for identifying the video content.

In a sequence subsequent to sequence S2, the application receiving unit 21 sequentially receives applications and priority records corresponding to the application IDs of the applications from the distribution server 10 through the terminal communication unit 26. For example, when four applications are sequentially transmitted from the distribution server 10, in sequence S3, the application receiving unit 21 receives the execution file of the application with an application ID of "1" and the priority record corresponding to the application ID of "1" from the distribution server 10 through the terminal communication unit 26.

In step B4, the installing unit 28 and the application executing unit 29 perform an application receiving process. Specifically, since the number of installable applications represented by the application control information stored in the terminal storage unit 27 is "10" and any application is not installed yet, the installing unit 28 can install the received applications and installs the received application with an application ID of "1". Specifically, the installing is an operation of saving an execution file and a priority record of an application in the terminal storage unit 27 and causing the application to be executable by the application executing unit 29. For example, when an execution file of an application is an archive file, a process of developing the archive file or the like is performed.

The installing unit 28 stores the number of installed applications in the terminal storage unit 27. The installing unit 28 determines the number of applications which can be installed more on the basis of the number of installable applications of the application control information and the number of installed applications stored in the terminal storage unit 27. The application executing unit 29 stores the number of applications under execution and the number of applications under display in the terminal storage unit 27. The installing unit 28 determines the number of applications which can be executed more and the number of applications in which image information created therefrom can be displayed more on the basis of the number of executable applications and the number of displayable applications of the application control information and the number of applications under execution and the number of applications under display stored in the terminal storage unit 27.

Since the number of executable applications represented by the application control information stored in the terminal storage unit 27 is "5" and any application is not executed yet, the application executing unit 29 determines that the installed application with an application ID of "1" can be executed and executes the installed application with an application ID of "1". Since the number of displayable applications represented by the application control information stored in the terminal storage unit 27 is "3" and image information created by any application is not displayed yet, the application executing unit 29 displays information outputted from the executed application with an application ID of "1" on the first application display area 62.

In sequence S4 after step B4, the application receiving unit 21 receives the execution file of the application with an application ID of "2" and the priority record corresponding to the application ID of "2" from the distribution server 10 through the terminal communication unit 26. In practice, the execution file or the priority record of an application is divided into packets and the packets are transmitted and received. The received packets are temporarily buffered by the terminal communication unit 26 or the like and are then saved in the terminal storage unit 27. However, this is based on the related art and thus will not be described below.

In step B5, the installing unit 28 and the application executing unit 29 perform an application receiving process. Specifically, since the number of installable applications represented by the application control information stored in the terminal storage unit 27 is "10" and only one application is installed, the installing unit 28 determines that the received applications can be installed, and installs the received application with an application ID of "2".

Further, since the number of executable applications represented by the application control information stored in the terminal storage unit 27 is "5" and only one application is executed, the application executing unit 29 determines that the installed application with an application ID of "2" can be executed and executes the installed application with an application ID of "2".

Further, since the number of displayable applications represented by the application control information stored in the terminal storage unit 27 is "3" and image information created by only one application is displayed, the image information created by the executed application with an application ID of "2" can be displayed. The application executing unit 29 compares the display priorities of two applications under execution, displays the image information created by the application having the highest priority in the first application display area 62, and displays the image information created by the application having the second highest priority in the second application display area 63.

For example, when the display priority represented by the priority record corresponding to the application ID of "1" is "4" and the display priority represented by the priority record corresponding to the application ID of "2" is "2", the application executing unit 29 displays the image information created by the application with an application ID of "1" in the first application display area 62 and displays the image information created by the application with an application ID of "2" in the second application display area 63.

In sequence S5 after step B5, the application receiving unit 21 receives the execution file of the application with an application ID of "3" and the priority record corresponding to the application ID of "3" from the distribution server 10 through the terminal communication unit 26.

In step B6, the installing unit 28 and the application executing unit 29 perform an application receiving process. Specifically, since the number of installable applications represented by the application control information stored in the terminal storage unit 27 is "10" and only two applications are installed, the installing unit 28 determines that the received applications can be installed, and installs the received application with an application ID of "3".

Further, since the number of executable applications represented by the application control information stored in the terminal storage unit 27 is "5" and only two applications are executed, the application executing unit 29 determines that the installed application with an application ID of "3" can be executed, and executes the installed application with an application ID of "3".

Further, since the number of displayable applications represented by the application control information stored in the terminal storage unit 27 is "3" and only image information created by two applications is displayed, the image information created by the executed application with an application ID of "3" can be displayed. The application executing unit 29 compares the display priorities of three applications under execution, displays the image information created by the application having the highest priority in the first application display area 62, displays the image information created by the application having the second highest priority in the second application display area 63, and displays the image information created by the application having the third highest priority in the third application display area 64.

In this case, since the display priority represented by the priority record corresponding to the application ID of "1" is "4", the display priority represented by the priority record corresponding to the application ID of "2" is "2", and the display priority represented by the priority record corresponding to the application ID of "3" is "3", the application executing unit 29 displays the image information created by the application with an application ID of "1" in the first application display area 62, displays the image information created by the application with an application ID of "3" in the second application display area 63, and displays the image information created by the application with an application ID of "2" in the third application display area 64.

In sequence S6 after step B6, the application receiving unit 21 receives the execution file of the application with an application ID of "4" and the priority record corresponding to the application ID of "4" from the distribution server 10 through the terminal communication unit 26.

In step B7, the installing unit 28 and the application executing unit 29 perform an application receiving process and end the application executing process. Specifically, since the number of installable applications represented by the application control information stored in the terminal storage unit 27 is "10" and only three applications are installed, the installing unit 28 determines that the received applications can be installed, and installs the received application with an application ID of "4".

Further, since the number of executable applications represented by the application control information stored in the terminal storage unit 27 is "5" and only three applications are executed, the application executing unit 29 determines that the installed application with an application ID of "4" can be executed, and executes the installed application with an application ID of "4".

Further, the number of displayable applications represented by the application control information stored in the terminal storage unit 27 is "3" and image information created by three applications has been already displayed. Accordingly, when the image information created by all the four applications are displayed, the image information created by any one application is not displayed.

The application executing unit 29 compares the display priorities of four applications under execution, displays the image information created by the application having the highest priority in the first application display area 62, displays the image information created by the application having the second highest priority in the second application display area 63, and displays the image information created by the application having the third highest priority in the third application display area 64.

In this case, since the display priority represented by the priority record corresponding to the application ID of "1" is "4", the display priority represented by the priority record corresponding to the application ID of "2" is "2", the display priority represented by the priority record corresponding to the application ID of "3" is "3", and the display priority represented by the priority record corresponding to the application ID of "4" is "1", the application executing unit 29 displays the image information created by the application with an application ID of "1" in the first application display area 62, displays the image information created by the application with an application ID of "3" in the second application display area 63, displays the image information created by the application with an application ID of "2" in the third application display area 64, and does not display the image information created by the application with an application ID of "4". An application of which the created image information cannot be displayed may be controlled not to be executed. The application execution file and the priority record of an application which is determined not to be executed may be deleted from the terminal storage unit 27, or may be saved in the terminal storage unit 27 for the purpose of restart when another application is ended later and the corresponding application can be executed again.

Figure 9:
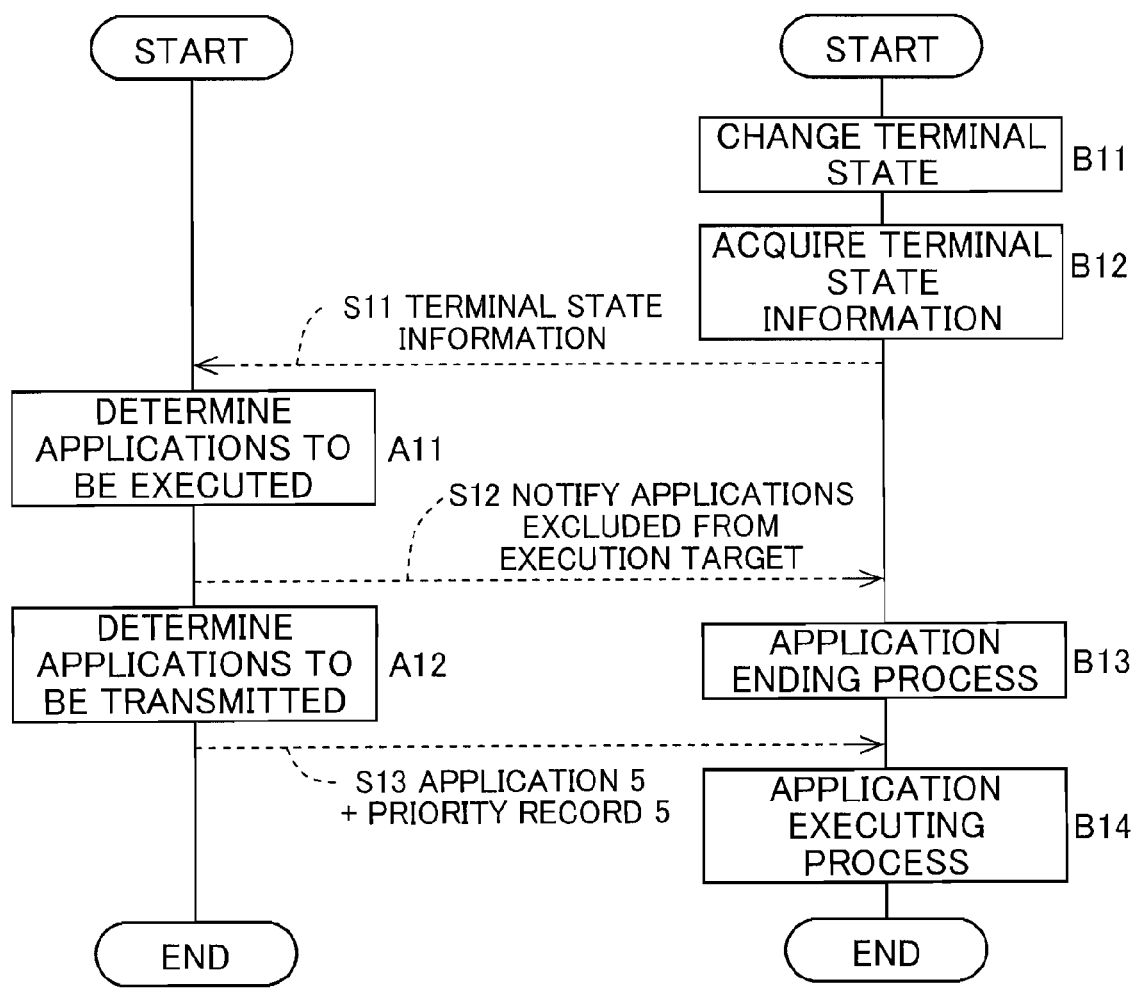
FIG. 9 is a sequence diagram illustrating the process flow of a state changing process performed by the distribution server and the terminal.

FIG. 9 is a sequence diagram illustrating the process flow of a state changing process performed by the distribution server 10 and the terminal 20. The left process flow in FIG. 9 shows a process flow of an application re-distributing process performed by the server CPU, and the right process flow shows a process flow of a terminal state changing process performed by the terminal CPU. In sequence S11, when the terminal state receiving unit 14 receives terminal state information through the server communication unit 18, the process flow goes to step A11. When a user changes a watched channel through the input unit 30, the process flow goes to step B11.

In step A11, the application managing unit 11 determines whether it is necessary to change an application to be executed on the basis of the terminal state information received by the terminal state receiving unit 14 in sequence S11. Specifically, the application managing unit 11 reads the application ID, corresponding to the channel number represented by the terminal state information received by the terminal state receiving unit 14 in sequence S11, from the terminal state table 53. Out of the application IDs of the applications previously transmitted to the terminal 20, an application of an application ID not included in the read application IDs is excluded from the execution target. In sequence S12, the application transmitting unit 12 transmits the application ID of the application, which is excluded from the execution target by the application managing unit 11, along with such a fact of exclusion from the execution target to the terminal 20 through the server communication unit 18.

For example, in step A11, when the channel number represented by the terminal state information received by the terminal state receiving unit 14 in sequence S11 is Channel 2 and the channel number represented by the terminal state information received by the terminal state receiving unit 14 in sequence S2 shown in FIG. 8 is Channel 1, the applications with the application IDs "3" and "4" are determined to be excluded from the execution target in the terminal state table 53. The application transmitting unit 12 transmits the application IDs "3" and "4" of the applications excluded from the execution target along with such a fact of exclusion from the execution target to the terminal 20 through the server communication unit 18 in sequence S12.

In step A12, the application managing unit 11 determines applications to be transmitted. Specifically, since the application IDs of the execution target applications corresponding to Channel 2 are "1", "2", and "5" in the terminal state table 53, the application managing unit 11 determines the applications with the application IDs of "1", "2", and "5" as the applications to be transmitted. Since the applications with the application IDs of "1" and "2" are already transmitted to the terminal 20, in sequence S13, the application transmitting unit 12 transmits the execution file of the application with the application ID of "5" and the priority record corresponding to the application ID of "5" to the terminal 20 through the server communication unit 18, and ends the application re-distributing process.

In step B11, a user operates the input unit 30 to change the watched channel, and the OS of the terminal 20 recognizes that the channel number is changed. In step B12, the terminal state transmitting unit 24 creates terminal state information. Specifically, the terminal state transmitting unit 24 creates the terminal state information on the basis of the channel number information acquired from the OS of the terminal 20. In sequence S11 after step B12, the terminal state transmitting unit 24 transmits the created terminal state information to the distribution server 10 through the terminal communication unit 26.

In sequence S12, the application receiving unit 21 receives the application IDs of the applications excluded from the execution target and such a fact of exclusion from the execution target from the distribution server 10 through the terminal communication unit 26. In step B13, the application execution unit 29 ends the execution of the applications with the received application IDs. In this case, the application receiving unit 21 receives the application IDs "3" and "4" of the applications excluded from the execution target and such a fact of exclusion from the execution target, and the application executing unit 29 ends the execution of the applications with the application IDs of "3" and "4". The execution files and the priority records of the ended applications do not have to be deleted from the terminal storage unit 27 to cope with a case where the watched channel is returned to the original state and the applications are executed again, or may be deleted from the terminal storage unit 27 and may be restarted in response to notification of the terminal state information when the watched channel is returned to the original.

In sequence S13, the application receiving unit 21 receives the execution file of the application with the application ID of "5" and the priority record corresponding to the application ID of "5" from the distribution server 10 through the terminal communication unit 26.

In step B14, the installing unit 28 and the application executing unit 29 perform the application executing process and ends the terminal state changing process. Specifically, since the number of installable applications represented by the application control information stored in the terminal storage unit 27 is "10" and only two applications are installed, the installing unit 28 can install the received application and installs the received application with the application ID of "5".

Since the number of executable applications represented by the application control information stored in the terminal storage unit 27 is "5" and only two applications are executed, the application executing unit 29 can execute the installed application with the application ID of "5" and executes the installed application with an application ID of "5".

Further, since the number of displayable applications represented by the application control information stored in the terminal storage unit 27 is "3" and only image information created by two applications is displayed, the image information created by the executed application with the application ID of "5" can be displayed. The application executing unit 29 compares the display priorities of three applications under execution, displays the image information created by the application having the highest priority in the first application display area 62, displays the image information created by the application having the second highest priority in the second application display area 63, and displays the image information created by the application having the third highest priority in the third application display area 64.

In this case, since the display priority represented by the priority record corresponding to the application ID of "1" is "4", the display priority represented by the priority record corresponding to the application ID of "2" is "2", and the display priority represented by the priority record corresponding to the application ID of "5" is "5", the application executing unit 29 displays the image information created by the application with an application ID of "1" in the first application display area 62, displays the image information created by the application with an application ID of "5" in the second application display area 63, displays the image information created by the application with an application ID of "2" in the third application display area 64, and then ends the terminal state changing process.

Therefore, when a user changes the watched channel, the executed application is changed to the application corresponding to the changed channel.

Figure 10:
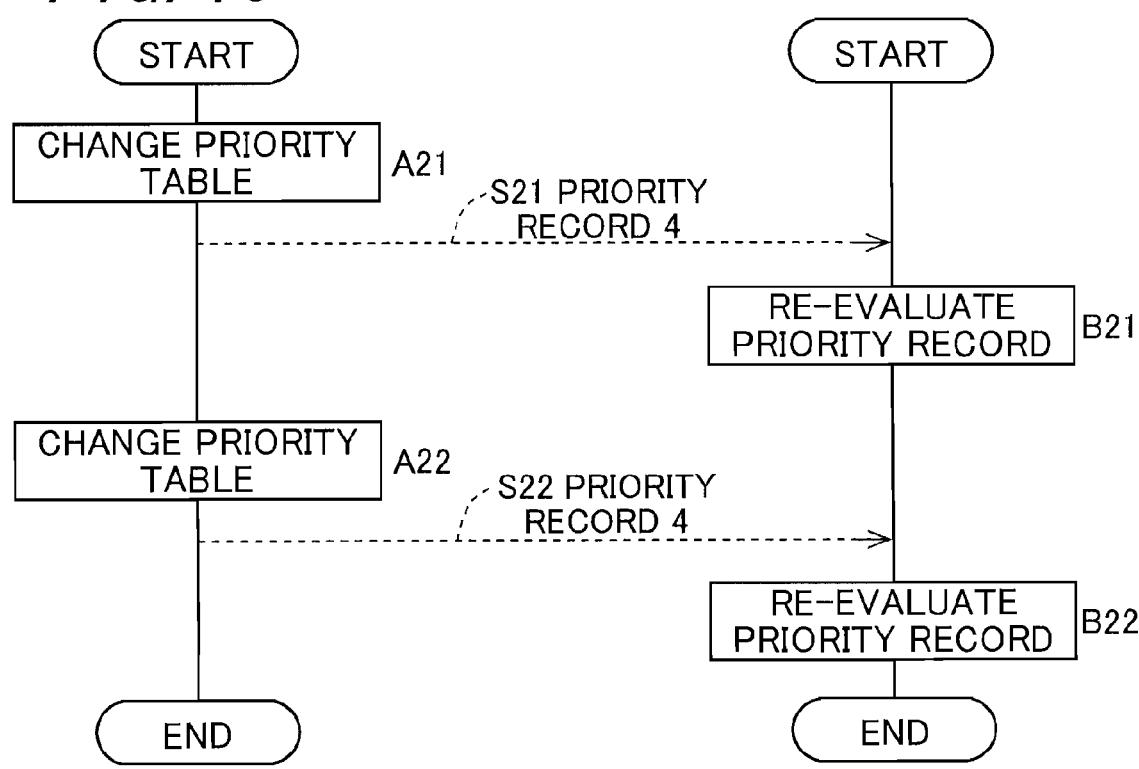
FIG. 10 is a sequence diagram illustrating the process flow of a priority changing process performed by the distribution server and the terminal.

FIG. 10 is a sequence diagram illustrating the process flow of a priority changing process performed by the distribution server 10 and the terminal 20. The left process flow shown in FIG. 10 shows a process flow of a priority setting changing process performed by the server CPU and the right process flow shows a process flow of a priority re-evaluating process performed by the terminal CPU.

For example, when there is an application which is wanted to preferentially execute at a certain date and time, it can be considered that various priorities of applications are changed in accordance with a schedule stored in advance in the distribution server 10. For example, a schedule is assumed that the execution priority and the display priority of the application ID "4" shown in FIG. 4 are set to "1" at the time point of installation, are changed to "5" at the time point of 19:00, and are changed to "1" at the time point of 20:00. The information of this priority changing schedule is saved in advance in the server storage unit 17 by a developer of an application or a manager of a distribution server.

In the distribution server 10, the process flow goes to step A21 at the time point of 19:00. In the terminal 20, when the priority re-receiving unit 25 receives a priority record through the terminal communication unit 26 in sequence S21, the process flow goes to step B21.

In step A21, the priority changing unit 15 changes the priority table 51. Specifically, the priority changing unit 15 changes the execution priority of Application 4 in the priority table 51 to "4" and changes the display priority thereof to "5" on the basis of the information of the priority changing schedule stored in the server storage unit 17. In sequence S21 after step A21, the priority re-transmitting unit 16 reads the priority record, in which the priority of an application is changed, from the priority table 51, and transmits the read priority record to the terminal 20 through the server communication unit 18.

Thereafter, at the time point of 20:00, the process flow goes to step A22, and the priority changing unit 15 changes the priority table 51. Specifically, the priority changing unit 15 changes the execution priority and the display priority of Application 4 in the priority table 51 to "1" and "1", respectively, on the basis of the information of the priority changing schedule stored in the server storage unit 17. In sequence S22 after step A22, the priority re-transmitting unit 16 reads the priority record, in which the priority of an application is changed, from the priority table 51, transmits the read priority record to the terminal 20 through the server communication unit 18, and ends the priority setting changing process.

In step B21, the installing unit 28 and the application executing unit 29 re-evaluate the priorities on the basis of the priority record received in sequence S21. Specifically, the installing unit 28 does not evaluate the number of installable applications, because the number of installable applications is not changed. The application executing unit 29 does not evaluate the number of executable applications when the execution priority is not changed or when the number of installed applications is equal to or less than the number of executable applications, but evaluates the application to be executed on the basis of the execution priority of the installed application when the execution priority is changed and the number of installed applications is larger than the number of executable applications. The application executing unit 29 does not evaluate the number of displayable applications when the display priority is not changed, but evaluates the application to be displayed on the basis of the display priority of the application estimated to be an application to be executed in the evaluation of the number of executable applications when the display priority is changed.

For example, when Channel 1 is selected and four applications with application IDs of "1" to "4" are executed in the terminal 20, the execution priority of the application with the application ID of "4" is changed from "1" to "5" but the number of installed applications is equal to or less than the number of executable applications. Accordingly, the installing unit 28 does not change the application under execution.

Regarding the number of displayable applications, the display priority of the application with the application ID of "4" is changed from "1" to "4". Regarding the changed priorities of the applications, the display priority corresponding to the application ID "1" is "4", the display priority corresponding to the application ID "2" is "2", the display priority corresponding to the application ID "3" is "3", and the display priority corresponding to the application ID "4" is "5". Therefore, the image information created by the application with the application ID of "5" is displayed in the first application display area 62, the information outputted from the application with the application ID of "1" is displayed in the second application display area 63, the image information created by the application with the application ID of "3" is displayed in the third application display area 64, and the image information created by the application with the application ID of "2" is not displayed.

When plural applications with the same display priority are present, it can be considered that the priority therebetween is determined on the basis of the total value of priorities. When the total values of priorities are also the same, it can be considered that the priority is determined on the basis of the magnitude of the application IDs. Since the application IDs are managed to be unique to the applications by the distribution server 10, the priorities can also be determined uniquely.

In sequence S22, the priority re-receiving unit 25 receives the priority record transmitted from the distribution server 10 through the terminal communication unit 26. In step B22, the installing unit 28 and the application executing unit 29 re-evaluate the priorities on the basis of the priority record received in sequence S22, and end the priority re-evaluating process. Specifically, the installing unit 28 and the application executing unit 29 re-evaluate the priorities on the basis of the priority record received in sequence S22, similarly to step B21.

For example, when Channel 1 is selected and four applications with application IDs of "1" to "4" are executed in the terminal 20, the execution priority of the application with the application ID of "4" is changed from "4" to "1" but the number of installed applications is equal to or less than the number of executable applications. Accordingly, the installing unit 28 does not change the application under execution.

Regarding the number of displayable applications, the display priority of the application with the application ID of "4" is changed from "4" to "1". Regarding the changed priorities of the applications, the display priority corresponding to the application ID "1" is "4", the display priority corresponding to the application ID "2" is "2", the display priority corresponding to the application ID "3" is "3", and the display priority corresponding to the application ID "4" is "1". Therefore, the application executing unit 29 displays the image information created by the application with the application ID of "1" in the first application display area 62, displays the image information created by the application with the application ID of "3" in the second application display area 63, displays the image information created by the application with the application ID of "2" in the third application display area 64, and does not display the image information created by the application with the application ID of "4".

Therefore, since the application with the application ID of "4" is an advertisement application displaying an advertisement, the information of the advertisement outputted by the advertisement application is displayed in the first application display area which is most conspicuous at the time point of 19:00, and the original state in which the advertisement information is not displayed is restored at the time point of 20:00, in the place of a user.

In the application control system 1, since the manager of the distribution server 10 can determine what time to change the priority and how to change the priority, it can be considered that the manager of the distribution server 10 sets the priority depending on the registration fee for the application received from an application developer. When the number of applications displayable in the terminal 20 is "3", 24 hours are partitioned by one hour and three "ranges" corresponding to the first application display area 62, the second application display area 63, and the third application display area 64 are set up in each partitioned time interval. The operating company of the distribution server 10 sets up a right (hereinafter, referred to as "right of use") to execute the application for each range, and sells the right of use of the range corresponding to the first application display area 62, that is, the largest display area in the terminal 20, for three million yen, sells the right of use of the range corresponding to the second application display area 63, that is, the second largest display area, for two million yen, and sells the right of use of the range corresponding to the third application display area 64, that is, the smallest display area, for one million yen to the application developers. These prices are only examples of an indicator for determining a priority.

For example, as for the first application display area 62, it is assumed as shown in Table 1 that Company A pays a registration fee of three million yen to the operating company of the distribution server 10 for the right of use of the time zone of 19:00 to 20:00 and Company B pays a registration fee of three million yen to the operating company of the distribution server 10 for the right of use of the time zone of 20:00 to 21:00. In the time zone of 19:00 to 20:00, the display priority of Application a, which is registered by Company A, for displaying an advertisement of Company A becomes high. In the time zone of 20:00 to 21:00, the display priority of Application b, which is registered by Company B, for displaying an advertisement of Company B becomes high. At the time point of 20:00, the display priority of Application a becomes "0", the display priority of Application b becomes "5", and the image information displayed in the first application display area 62 is completely changed from the image information created by Application a to the image information created by Application b.

TABLE 1

| Time zone | Display priority of Application a | Display priority of Application b |
| --- | --- | --- |
| 18:00-19:00 | 0 | 0 |
| 19:00-20:00 | 5 (Three million yen) | 0 |
| 20:00-21:00 | 0 | 5 (Three million yen) |

In this way, the operating company of the distribution server 10 can control the timing of displaying an advertisement on a place visible to a user. Therefore, the application control system 1 can be used in a business for receiving the registration fee of more expensive applications in compensation for displaying the advertisement at a timing at which advertising effect is higher by the application developers who want to display their advertisement by causing the terminal 20 to execute an advertisement application.

FIG. 11 is a diagram illustrating an example of a priority table 51a which is a modified example of the priority table 51. The priority table 51a shown in FIG. 11 is a table in which an audio output priority column 517, an input receiving priority column 518, and a communication priority column 519 are added to the priority table 51 shown in FIG. 4. The same columns as in the priority table 51 shown in FIG. 4 are denoted by the same reference numerals, and description thereof will be omitted to avoid repetition.

The audio output priority column 517 is a column when audio information created by each application in the terminal 20 is outputted. In this example, since an audio of an application for delivering a video and displaying an advertisement is also important, the priority thereof is set to be high. Since an application for displaying SNS information or displaying program information does not output an audio, the priority of an audio output is "0". Only audio information created by an application having a highest audio output priority is outputted from the audio output unit 32.

For example, when the applications with the application IDs "1" to "3" are executed with reference to the priority table 51a, the audio output priorities of application IDs "2" and "3" are "0", and thus audio information created by the application with the application ID "1" of which the audio output priority is "3" is outputted. When the channel selected by the input unit 30 is changed and the application with the application ID "4" starts to be executed, the audio output priority of application ID "4" is the highest priority of "4", and thus audio information created by the application with the application ID "4" is outputted. Only audio information of the application in which image information is displayed may be outputted, and audio information of the application in which image information is not displayed may also be outputted.

Audio information of a video displayed on the video display area 61 receiving broadcast and audio information created by the application having the highest audio output priority are outputted by mixture. As the priority of audio information created by the application is higher, an output volume may become larger, and thus it may be easy to listen in, or the output of audio information of a video of the application having the highest priority which is displayed on the video display area 61 receiving broadcast may be stopped. Mixtures thereof may be set by a viewer through a setting screen. The registration fee to the application distribution server 10 may be set depending on the audio output priority.

The input receiving priority column 518 is a column representing a priority for assigning the input unit 30 included in the terminal 20 to an application. The terminal CPU sends information, which is inputted from the input unit 30, to only an application to which the input unit 30 is assigned. Specifically, the input unit 30 can be assigned to the application having the highest input receiving priority. When information of a character string is inputted from the input unit 30 such as keyboard, the input character string is sent to the application having the highest input receiving priority to which the input unit 30 is assigned. Since video delivery just causes a video to be reproduced successively, the input is unnecessary, and the input receiving priority is "0". In the SNS information display and the advertisement display, when a display content is changed in accordance with a position clicked by the input unit 30 such as, for example, a mouse, the input unit 30 is required to be assigned.

The communication priority column 519 is a column representing a priority when an application accesses the service providing server 40. The terminal CPU preferentially transmits and receives packets for an application having a high priority. For example, the moving image delivery application is required to receive a large amount of packets successively in order to receive moving image information in a streaming manner. The program information display application merely receives information of a character string or a still image, and may only receive a small amount of packets intermittently. Therefore, the moving image delivery application is required to transmit and receive packets preferentially rather than the program information display application. When the registration fees to the distribution server 10 are different from each other depending on the communication priority, developers of the moving image delivery application who want to receive packets as preferentially as possible pay a large amount of registration fees, whereas developers of the program information display application who do not have to receive packets preferentially pay a small amount of registration fees. Thus, the determination of the priority may be made when the application developers register an application to the distribution server 10. Regarding an application executed in background, communication is performed depending on the communication priority.

The packets are normally cued in the distribution server 10 or the terminal 20, and are transmitted in a first-in first-out (abbreviated as FIFO) manner. However, even when the packets from the application having a low priority are first stored in a cue, when the packets from the application having a higher priority are then stored in a cue, the transmission and reception of the packets can be controlled in accordance with a method of first transmitting the packets of the application having a high priority. This is a method in the related art.

Hereinafter, as a second embodiment, a case where the terminal 20 is an electronic book reader will be described by way of example with reference to FIGS. 12 to 18.

FIG. 12 is a diagram illustrating an example of the priority table 54. The terminal 20 which is an electronic book reader can acquire contents constituted by document information representing a document (hereinafter, also called "document contents") or an application from the distribution server 10, display the acquired contents, or execute the acquired application. The contents are displayed by an electronic book display application. In this embodiment, the electronic book display application is assumed to be downloaded from the distribution server 10 in advance and have been already installed. Similarly to other applications, the execution of the electronic book display application is controlled by the application control unit 22 or the application executing unit 29, but includes an exclusive display area. The document contents are, for example, contents of documents such as a novel, a magazine, a comic and a tour guidebook. The tour guidebook is a document for providing information guiding destination regions to a tourist, and includes latitude and longitude information representing latitude and longitude of positions of major facilities of destinations. The major facilities include an accommodation facility, a tour facility, a store, a station and the like.

The priority table 54 is a table used in the case where the terminal 20 is an electronic book reader, and a table stored in the server storage unit 17 of the distribution server 10. The priority table 54 stores priority information representing a priority of execution of an application in correlation with the application ID of the application. Particularly, the priority table 54 stores a priority of display in correlation with the application ID, as a priority according to the distance between the position of a major facility specified by the contents and the application and the position of the terminal 20 displaying the contents.

The priority table 54 includes an application ID column 511, a name column 512, an application type column 513, a target content column 544, a reference latitude column 545, a reference longitude column 546 and a display priority column 547. Hereinafter, one set of information constituted by each of the rows, that is, the application ID column 511, the name column 512, the application type column 513, the target content column 544, the reference latitude column 545, the reference longitude column 546 and the display priority column 547 is referred to as a "priority record". The same columns as in the priority table 51 shown in FIG. 4 are denoted by the same reference numerals, and description thereof will be omitted to avoid repetition.

The target content column 544 is a column representing identification information (hereinafter, referred to as a "content ID") for identifying a content to be executed in the terminal 20 when the application of the application ID indicated in the application ID column 511 included in the corresponding, that is, same priority record is executed in the terminal 20. That is, when the content of the content ID indicated in the target content column 544 is executed in the terminal 20, the application of the application ID indicated in the corresponding application ID column 511 becomes a candidate executed in the terminal 20.

The reference latitude column 545 is a column representing a reference latitude which is the latitude of the position at which the major facility specified by the application of the application ID indicated in the application ID column 511 and the content of the content ID indicated in the target content column 544 is located. The reference longitude column 546 is a column representing a reference longitude which is the longitude of the position at which the major facility specified by the application with the application ID marked in the application ID column 511 and the content of the content ID marked in the target content column 544 is located.

The display priority column 547 represents the priorities, that is the order of priorities, of applications executed in the terminal 20. The larger number of the priority represents the higher priority. When the priority is "0", it means that the corresponding application is not executed. The display priority column 547 includes a "0-1 km" column 547a, a "1-5 km" column 547b, a "5-10 km" column 547c, and a "over 10 km" column 547d depending on the distance between a position determined by the reference latitude marked in the reference latitude column 545 and the reference longitude marked in the reference longitude column 546 and a position of the terminal 20 executing the content with the content ID marked in the target content column 544. The "0-1 km" column 547a represents the priority when the distance between a major facility and the terminal 20 is less than 1 km, the "1-5 km" column 547b represents the priority when the distance between a major facility and the terminal 20 is equal to or more than 1 km and less than 5 km, the "5-10 km" column 547c represents the priority when the distance between a major facility and the terminal 20 is equal to or more than 5 km and less than 10 km, and the "over 10 km" column 547d represents the priority when the distance between a major facility and the terminal 20 is equal to or more than 10 km. Accordingly, the priority varies depending on the distance between a major facility and the terminal 20. The method of calculating the distance between a major facility and the terminal 20 from the reference latitude and the reference longitude representing the position of the major facility and the latitude and longitude representing the position of the terminal 20 may be based on the related art.

In the priority table 54 shown in FIG. 12, seven application IDs "1" to "7" are shown in the application ID column 511. Furthermore, the name column 512 corresponding to each application ID, the application type column 513, the target content column 544, the reference latitude column 545, the reference longitude column 546, the "0-1 km" column 547a, the "1-5 km" column 547b, the "5-1 m" column 547c, and the "over 10 km" column 547d are "Application 1", "advertisement information of Store 1", "Content 1", "lat1", "lng1", "5", "4", "3", and "0", respectively, for Application ID "1". For Application ID "2", they are "Application 2", "advertisement information of Store 2", "Content 1", "lat2", "lng 2", "4", "4", "2", and "0", respectively. For Application ID "3", they are "Application 3", "advertisement information of Store 3", "Content 1", "lat3", "lng3", "5", "3", "3", and "0", respectively. For Application ID "4", they are "Application 4", "airplane ticket reservation", "Content 1", "lat4", "lng4", "0", "0", "0", and "5", respectively. For Application ID "5", they are "Application 5", "hotel reservation", "Content 1", "lat5", "lng5", "2", "2", "2", and "4", respectively. For Application ID "6", they are "Application 6", "weather forecast", "Content 1", "lat6", "lng6", "1", "1", "1", and "1", respectively. For Application ID "7", they are "Application 7", "advertisement information of Store 4", "Content 2", "lat7", "lng7", "5", "4", "3", and "0", respectively.

For example, in the terminal 20, when the content displayed by the electronic book display application is Content 1, Application 7 is not a transmission candidate to the terminal 20. The priority table 20 shown in FIG. 12 is an example where Contents 1 and 2 are tour guide books. For the main facility specified by the application of the application ID shown in the application ID column 511 and the content of the content ID shown in the target content column 544, Applications 1 to 3 and 7 are applications displaying an advertisement which are registered in the distribution server 10 by a specific store. The reference latitude and the reference longitude indicate positional information of a store in which the application is registered. Application 4 is an application for reserving an airplane ticket, which is registered in the distribution server 10 by a management company of an airport facility of a local area relating to Content 1, for example, a city which is guided by a tour guide book, and the reference latitude and the reference longitude indicate positional information of the airport facility. Application 5 is an application for staying reservation for a specific accommodation facility, which is registered in the distribution server 10 by a management company of a local accommodation facility relating to Content 1, and the reference latitude and the reference longitude indicate positional information of the accommodation facility. Application 6 is an application for displaying a weather forecast of a local area relating to Content 1, which is registered in the distribution server 10 by a management company of a weather forecast service, and the reference latitude and the reference longitude indicate positional information of a location where a local weather forecast is observed, for example, a prefectural capital relating to Content 1.

For example, for Application 1, in a case where the terminal 20 is located at a position less than 1 km from the reference latitude and the reference longitude, the display priority is "5", and in a case where the terminal 20 is located at a position equal to or more than 1 km and less than 5 km, the display priority is "4". Applications 1 to 3 and 7 are applications displaying an advertisement of a store. When the terminal 20 is located at a portion closer to the store, a display priority is set to be higher in order to increase an advertisement effect. Application 4 is an application for reserving an airplane ticket, which should be executed before a user takes a tour. In a case where the terminal 20 is located at a position distant from the reference latitude and the reference longitude by equal to or more than 10 km, the display priority is set to "5", and in a case of less than 10 km, the display priority is set to "0". Application 5 is an application for reserving an accommodation facility, for example, hotel, which basically should be executed by a user before the user takes a tour. However, since a user may go to a local area without deciding a hotel, the display priority is set to a relatively high value even for a short distance less than 10 km. Application 6 is an application for acquiring and displaying information on a weather forecast, which should be executed before taking a tour and after arriving at a local area, and therefore is set to the same priority value regardless of the position of the terminal 20.

FIG. 13 is a diagram illustrating an example of an execution capability table 55. The execution capability table 55 is a table used in a case where the terminal 20 is an electronic book reader and is stored in the server storage unit 17 of the distribution server 10. The execution capability table 55 stores execution capability information representing capabilities on execution of the application, specifically, execution capability information representing the number of applications which are simultaneously controllable when controlling the applications for each terminal 20. The execution capability table 55 includes the terminal ID column 520 and the simultaneously-displayable application number column 523. The same columns as the execution capability table 52 shown in FIG. 5 are denoted by the same reference numerals, and explanation thereof will be omitted to avoid repetition.

Figure 14:
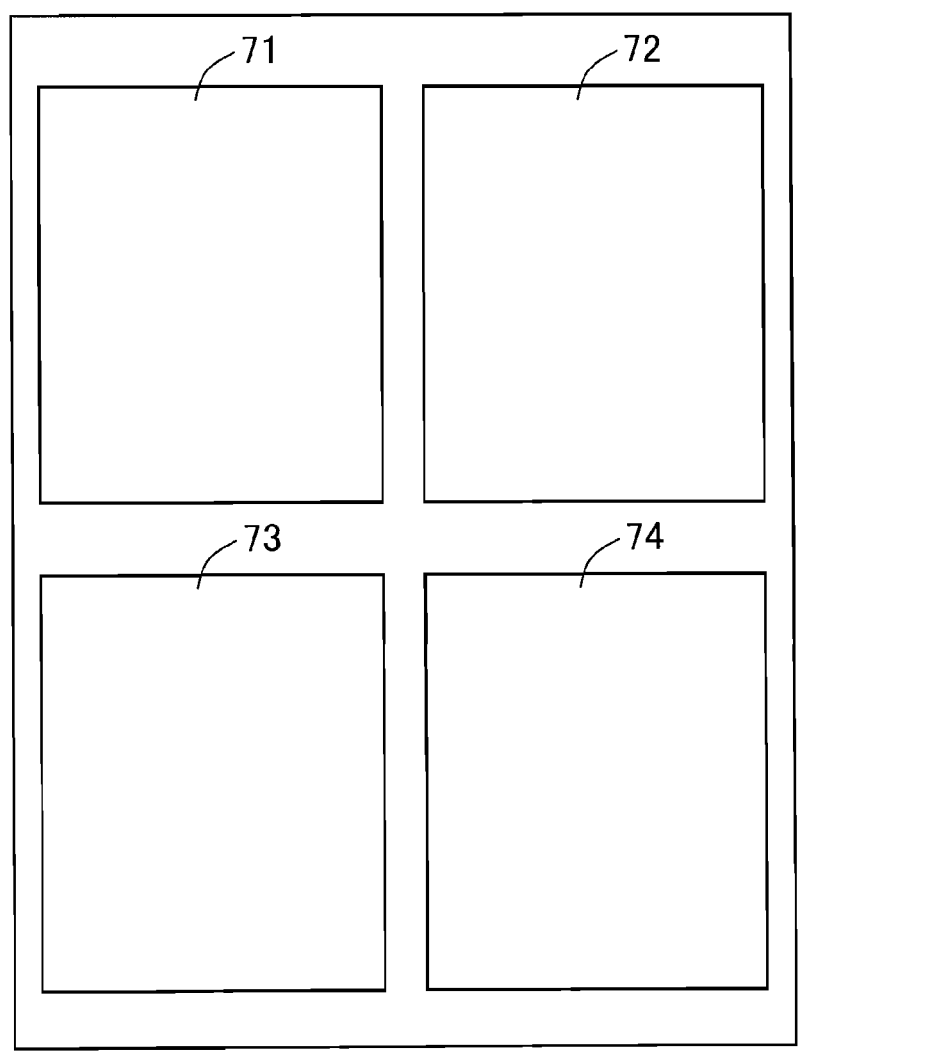
FIG. 14 is a diagram illustrating an example of a first electronic book reader screen.

FIG. 14 is a diagram illustrating an example of a first electronic book reader screen 70. The first electronic book reader screen 70 is a screen which is displayed on the screen display unit 31 by an electronic book display application in order that the terminal 20 displays the document content. The first electronic book reader screen 70 includes a plurality of cover image display areas for displaying cover images representing a cover of a document content (hereinafter, referred to as "electronic book content"), for example, first to fourth cover image display areas 71 to 74. The first cover image display area 71 is an upper left area of the screen, the second cover image display area 72 is an upper right area of the screen, the third cover image display area 73 is a lower left area of the screen, and the fourth cover image display area 74 is a lower right area of the screen. The first to fourth cover image display areas 71 to 74 are areas having the same size.

On the first electronic book reader screen 70 shown in FIG. 14, for example, a cover image of Electronic Book Content 1 is displayed on the first cover image display area 71, a cover image of Electronic Book Content 2 is displayed on the second cover image display area 72, a cover image of Electronic Book Content 3 is displayed on the third cover image display area 73, and a cover image of Electronic Book Content 4 is displayed on the fourth cover image display area 74.

The screen display unit 31 of the terminal 20 is configured by, for example, a touch panel and can be operated by touching a screen with a finger or the like. When selecting an electronic book content of which details are desired to be displayed from among the electronic book contents of the cover images displayed on each cover image display area, the content can be selected by contacting the cover image display area in which the cover image of the electronic book content which is desired to be selected is displayed.

Figure 15:
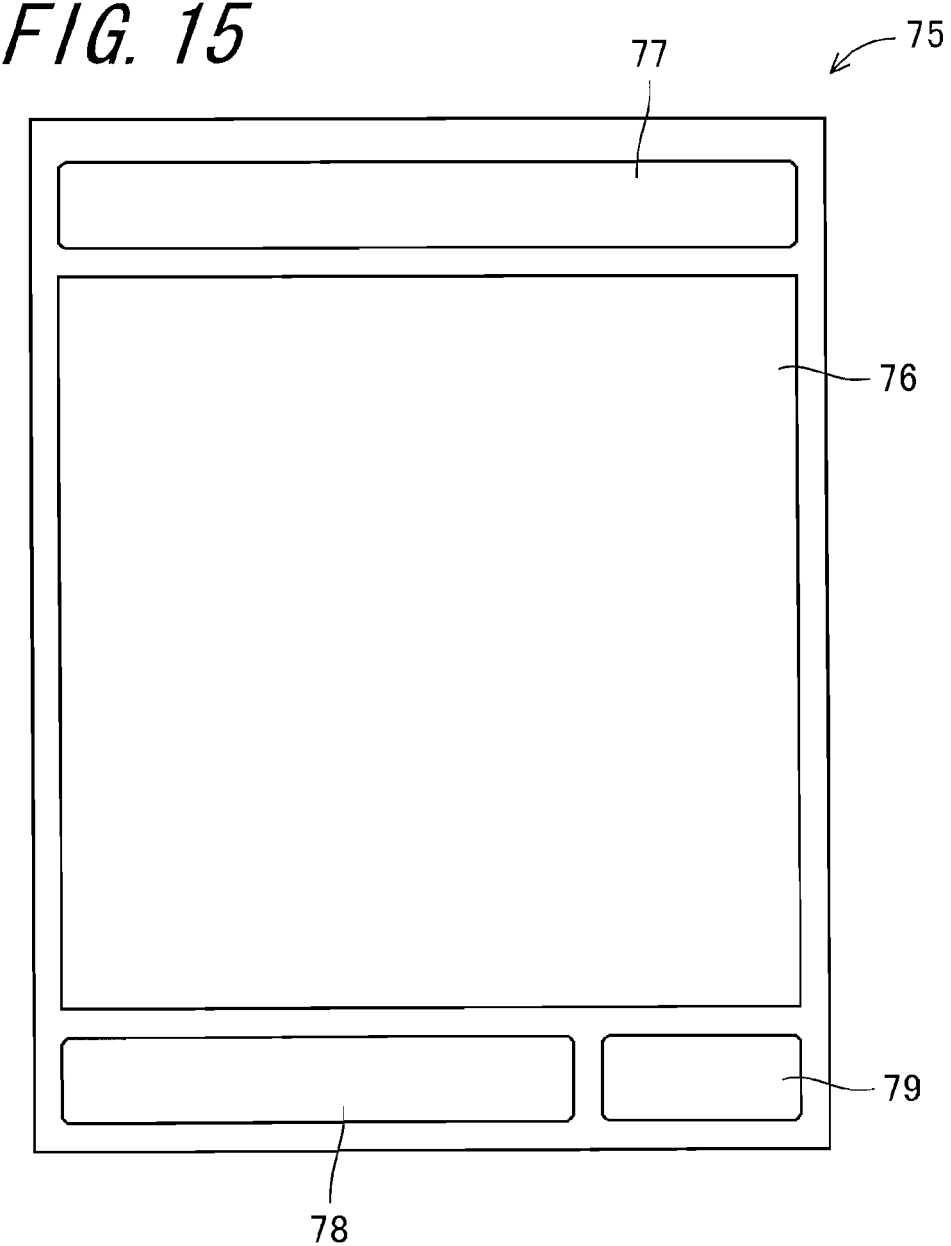
FIG. 15 is a diagram illustrating an example of a second electronic book reader screen.

FIG. 15 is a diagram illustrating an example of a second electronic book reader screen 75. The second electronic book reader screen 75 is a screen which, when any cover image display area of the first electronic book reader screen 70 shown in FIG. 14 is selected, displays the electronic book content of the selected cover image on the screen display unit 31. The second electronic book reader screen 75 includes an electronic book content display area 76 and first to third application display areas 77 to 79.

The electronic book content display area 76 is an area for displaying details of the electronic book content and is provided as a largest display area at a central portion of the screen. The electronic book content display area 76 is an area which is exclusively used by an electronic book display application. The first to third application display areas 77 to 79 are display areas which display information produced by applications other than the electronic book display application. The first application display area 77, which is the largest display area among the first to third application display areas 77 to 79 and is provided at an uppermost portion of the second electronic book reader screen 75, has the highest priority. The second application display area 78, which is the second-largest display area and is provided at the left side of a lowermost portion of the second electronic book reader screen 75, has the second-highest priority. The third application display area 79, which is the smallest display area and is provided at the right side of the lowermost portion of the second electronic book reader screen 75, has the third-highest priority.

Figure 16:
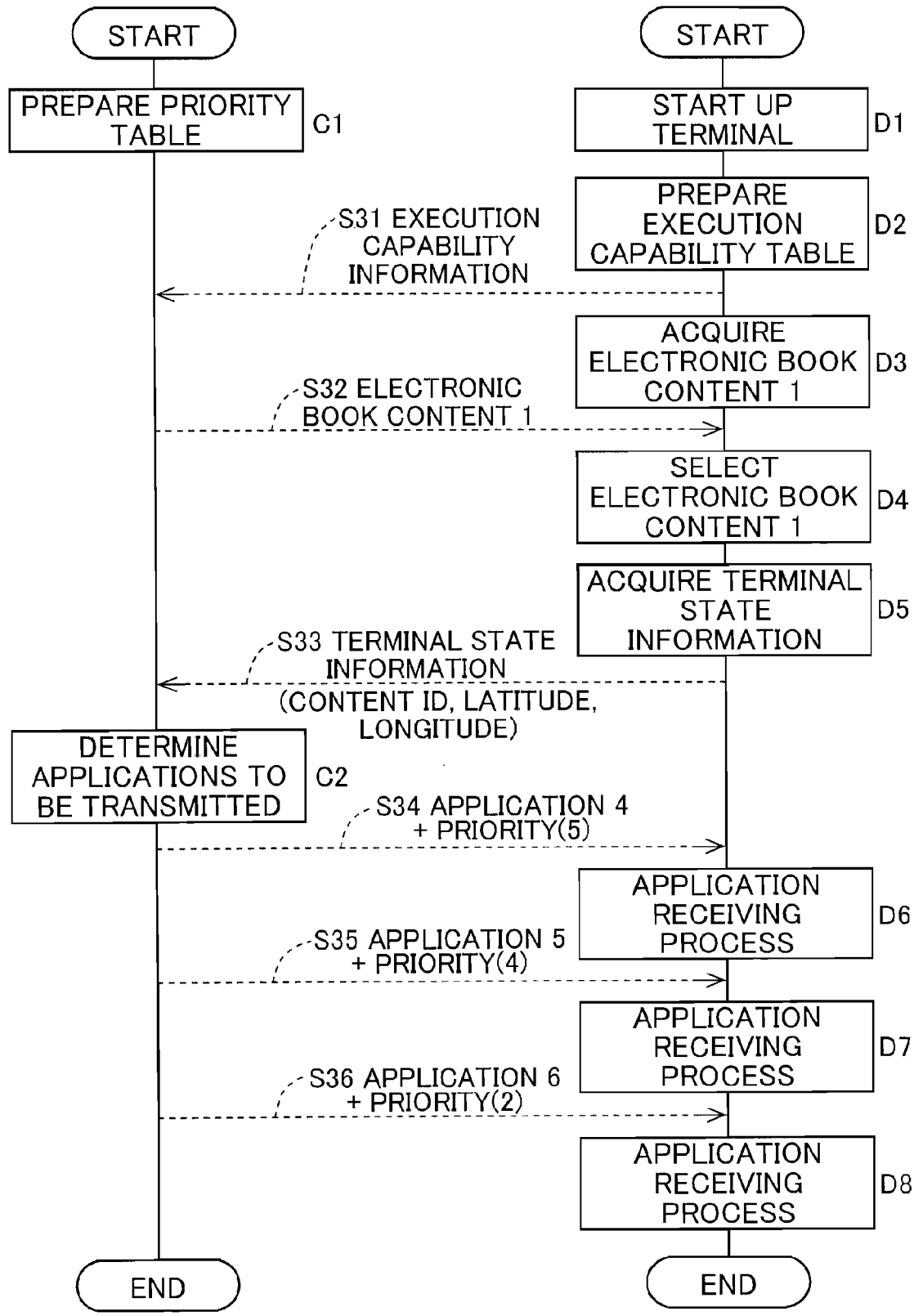
FIG. 16 is a sequence diagram illustrating the process flow of a long-distance application distributing process performed by the distribution server and the terminal.

FIG. 16 is a sequence diagram illustrating the process flow of a long-distance application distributing process performed by the distribution server 10 and the terminal 20. The left process flow in FIG. 16 shows a process flow of a long-distance application distributing process performed by the server CPU and the right process flow shows a process flow of a long-distance application executing process performed by the terminal CPU.

When the distribution server 10 is powered on and is in an operable state, the process flow goes to step C1. When the terminal 20 is powered on and is in an operable state, the process flow goes to step D1. Here, it is assumed that the terminal 20 is powered on in a place far apart from a region described in Electronic Book Content 1 as a tour guidebook, for example, in a place apart 10 km or more. Hereinafter, in FIGS. 16 to 18, transmission and reception of information between the distribution server 10 and the terminal 20 will be described with sequence numbers added thereto. The process flow of the distribution server 10 will be first described and then the process flow of the terminal 20 will be described. Step C1 is the same as step A1 shown in FIG. 8 and will not be described repeatedly.

After step C1, when a request for purchasing an electronic book content is given from the terminal 20 and payment for a desired electronic book content is finished, the desired electronic book content is transmitted to the terminal 20 through the server communication unit 18 in sequence S32. Electronic book contents are stored in the server storage unit 17, and the terminal 20 can select a desired electronic book content on a content purchase screen provided from the distribution server 10 and download the selected electronic book content. The content purchase screen provided from the distribution server 10 can be displayed through a web browser or the like of the terminal 20, and information such as a list of electronic book contents, summaries of the electronic book contents, and sale prices stored in the server storage unit 17 is displayed therein. The content purchasing method, the download method, and the purchase screen are based on the related art.

In sequence S33, when the server communication unit 18 receives the terminal state information from the terminal 20, the application managing unit 11 determines applications to be transmitted in step C2. The terminal state information received from the terminal 20 by the server communication unit 18 in sequence S33 includes the terminal ID, the content IDs, and the latitude and longitude information. The content IDs included in the terminal state information are content IDs of electronic book contents executed, that is, displayed, in the terminal 20 and the latitude and longitude information included in the terminal state information is information representing the latitude and longitude of the present location of the terminal 20.

Specifically, the application managing unit 11 determines applications and priorities to be transmitted to the terminal 20, which has transmitted the execution capability information and the terminal state information received by the server communication unit 18, on the basis of the execution capability information and the terminal state information received from the terminal 20 by the server communication unit 18. In a sequence subsequent to step C2, the application transmitting unit 12 sequentially transmits the applications and the priorities determined by the application managing unit 11, that is, priority information, to the terminal 20 through the server communication unit 18 in the ascending order of the application IDs, and ends the long-distance application distributing process.

More specifically, first, the application managing unit 11 extracts the application ID corresponding to the content ID included in the terminal state information on the basis of the priority table 54 and sets the application of the extracted application ID as a transmission candidate application. For example, when the content ID of the electronic book content executed in the terminal 20 is Content 1, the application IDs corresponding to Content 1 are "1" to "6" with reference to the priority table 54 shown in FIG. 12 and Applications 1 to 6 are transmission candidate applications.

Then, the application managing unit 11 calculates the distance between the location of the terminal 20 and the reference position of each application on the basis of reference latitudes and reference longitudes of Applications 1 to 6 and the latitude and the longitude represented by the latitude and longitude information included in the terminal state information. The reference position is a position determined by the reference latitude and the reference longitude. In this example, it is assumed that the position of the terminal 20 is a position apart from the region described in a tour guidebook as Content 1, that is, an electronic book content, executed in the terminal 20, and the position of the terminal 20 and the reference position for each of Applications 1 to 6 are apart by 10 km or more from each other and all the calculation results are more than or equal to 10 km.

Subsequently, the application managing unit 11 determines the display priority of each application with reference to the priority table 54. Since the calculation results of the distance for all the applications are 10 km or more, the priorities of Applications 1 to 3 are "0", the priority of Application 4 is "5", the priority of Application 5 is "4" and the priority of Application 6 is "3", with reference to the "over 10 km" column 547d in the priority table 54 shown in FIG. 12.

The application managing unit 11 determines applications to be transmitted on the basis of the determined priority and the simultaneously-displayable application number column 523 of the execution capability table 55. The value of the simultaneously-displayable application number column 523 in the execution capability table 55 shown in FIG. 13 is "3", and the application managing unit 11 determines three applications from the application having the highest display priority as the applications to be transmitted. Since the display priority of Application 4 is "5" which is the highest and the display priority is lowered in the order of Application 5 and Application 6, Applications 4 to 6 are determined as the applications to be transmitted.

In sequence S34 after step C2, the application transmitting unit 12 transmits the execution file of the application with the application ID of "4" and the display priority "5" corresponding to the application ID of "4" to the terminal 20 through the server communication unit 18. Subsequently, in sequence S35, the application transmitting unit 12 transmits the execution file of the application with the application ID of "5" and the priority "4" corresponding to the application ID of "5" to the terminal 20 through the server communication unit 18. Subsequently, in sequence S36, the application transmitting unit 12 transmits the execution file of the application with the application ID of "6" and the priority "4" corresponding to the application ID of "6" to the terminal 20 through the server communication unit 18, and ends the long-distance application distributing process. The application transmitting unit 12 stores the application IDs of the transmitted applications and the priorities thereof in the server storage unit 17 in correlation with each other.

Steps D1 and D2 are the same as steps B1 and B2 shown in FIG. 8, Sequence S31 is the same as sequence S1 shown in FIG. 8, and description thereof will be omitted to avoid repetition.

In step D3, an electronic book content which is purchased by a user having accessed the distribution server 10 through a web browser or the like is acquired. Specifically, in sequence S32, the application executing unit 29 downloads the purchased electronic book content from the distribution server 10 through the terminal communication unit 26 and stores the downloaded electronic book content in the terminal storage unit 28. The application executing unit 29 displays the covers of the electronic book contents stored in the terminal storage unit 28 on the screen display unit 31 like the first electronic book reader screen 70 shown in FIG. 14.

In step D4, the user operates the input unit 30, for example, touches a touch panel or operates a cursor key or the like, and selects an electronic book content to be executed, that is, displayed. The application executing unit 29 displays the second electronic book reader screen 75 shown in FIG. 15 on the screen display unit 31. At this time, an electronic book display application stored in the terminal storage unit 27 is executed. Thereafter, the application executing unit 29 displays information created by the electronic book application in the electronic book content display area 76 shown in FIG. 15. The electronic book display application displays the selected electronic book content, for example, Content 1, in the electronic book content display area 76.

In step D5, the terminal state transmitting unit 24 acquires the terminal state information. Specifically, the terminal state transmitting unit 24 acquires the contents ID of the displayed electronic book contents and the latitude and longitude information from the terminal state acquiring unit 33 through the OS of the terminal 20, and creates the terminal state information on the basis of the acquired content IDs and the acquired latitude and longitude information. The content IDs and the latitude and longitude information are information managed by the OS of the terminal 20. In sequence S33 after step D5, the terminal state transmitting unit 24 transmits the created terminal state information to the distribution server 10 through the terminal communication unit 26.

In a sequence subsequent to sequence S33, the application receiving unit 21 sequentially receives an application and the priority of the application from the distribution server 10 through the terminal communication unit 26. For example, when three applications are sequentially transmitted from the distribution server 10, the application receiving unit 21 first receives the execution file of the application with the application ID of "4" and the priority "5" corresponding to the application ID of "4" from the distribution server 10 through the terminal communication unit 26 in sequence S34.

In step D6, the installing unit 28 and the application executing unit 29 perform an application receiving process. Specifically, since the number of simultaneously-displayable applications represented by the application control information stored in the terminal storage unit 27 is "3" and any application is not executed yet, the received applications can be displayed and the installing unit 28 installs the received application with the application ID of "4". The application executing unit 29 executes the installed application with the application ID of "4" and displays information created by the application with an application ID of "4" in the first application display area 77 of the second electronic book reader screen 75 shown in FIG. 15.

In sequence S35 after step D6, the application receiving unit 21 receives the execution file of the application with the application ID of "5" and the priority "4" corresponding to the application ID of "5" from the distribution server 10 through the terminal communication unit 26.

In step D7, the installing unit 28 and the application executing unit 29 perform an application receiving process. Specifically, since the number of simultaneously-displayable applications represented by the application control information stored in the terminal storage unit 27 is "3" and only one application is executed, the received applications can be displayed and the installing unit 28 installs the received application with the application ID of "5". The application executing unit 29 executes the installed application with the application ID of "5". Since the priority "4" corresponding to the application ID of "5" is lower than the priority "5" corresponding to the application ID of "4" of the executed application, the information created by the application with the application ID of "5" is displayed in the second application display area 78 of the second electronic book reader screen 75 shown in FIG. 15.

In sequence S36 after step D7, the application receiving unit 21 receives the execution file of the application with the application ID of "6" and the priority "3" corresponding to the application ID of "6" from the distribution server 10 through the terminal communication unit 26.

In step D8, the installing unit 28 and the application executing unit 29 perform an application receiving process. Specifically, since the number of simultaneously-displayable applications represented by the application control information stored in the terminal storage unit 27 is "3" and only two applications are executed, the received applications can be displayed and the installing unit 28 installs the received application with the application ID of "6". The application executing unit 29 executes the installed application with the application ID of "6". Since the priority "3" corresponding to the application ID of "6" is lower than the priority "5" corresponding to the application ID of "4" of the executed application and the priority "4" corresponding to the application ID of "5", the information created by the application with the application ID of "6" is displayed in the third application display area 79 of the third electronic book reader screen 75 shown in FIG. 15. The application receiving unit 21 stores the application IDs and the priority records of the received applications in the terminal storage unit 27.

Therefore, hitherto, Application 4 is displayed in the first application display area 77, Application 5 is displayed in the second application display area 78, Application 6 is displayed in the third application display area 79, and Content 1 is displayed in the electronic book content display area 76.

Figure 17:
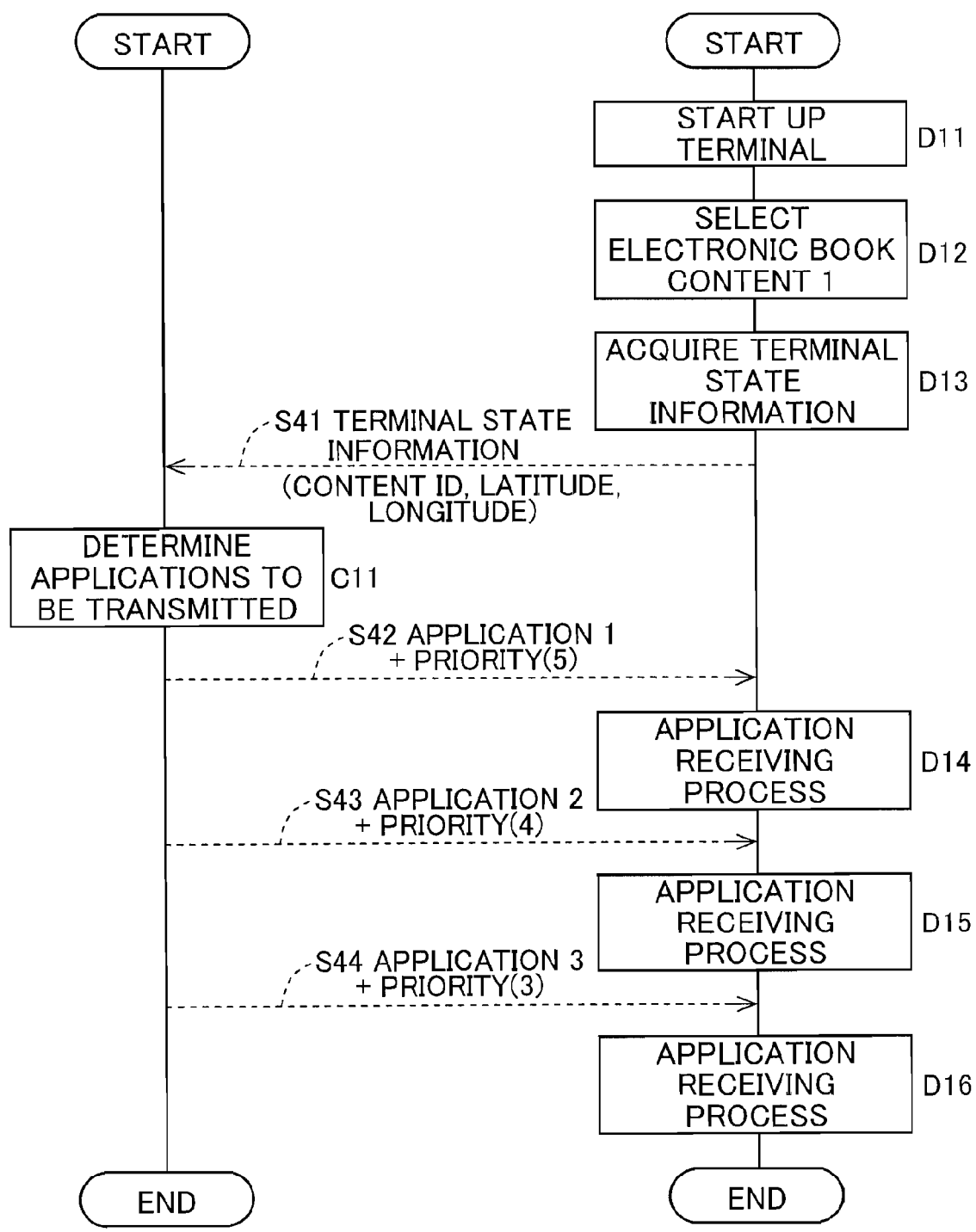
FIG. 17 is a sequence diagram illustrating the process flow of a short-distance application distributing process performed by the distribution server and the terminal.

FIG. 17 is a sequence diagram illustrating the process flow of a short-distance application distributing process performed by the distribution server 10 and the terminal 20. The left process flow in FIG. 17 shows a process flow of a short-distance application distributing process performed by the server CPU and the right process flow shows a process flow of a short-distance application executing process performed by the terminal CPU. When the terminal state receiving unit 14 receives the terminal state information through the server communication unit 18 in sequence S41, the process flow goes to step C11. When a user moves to a region described in tour guidebook by tour or the like and the terminal 20 is powered on and is in an operable state, the process flow goes to step D11.

In step C11, the application managing unit 11 determines applications to be transmitted. Specifically, the application managing unit 11 determines applications and priorities to be transmitted to the terminal 20, which has transmitted the terminal state information received by the server communication unit 18, on the basis of the execution capability information and the terminal state information received from the terminal 20 by the server communication unit 18. In a sequence subsequent to step C11, the application transmitting unit 12 sequentially transmits the applications and the priorities determined by the application managing unit 11, that is, priority information, to the terminal 20 through the server communication unit 18 in the ascending order of the application IDs, and ends the short-distance application distributing process.

More specifically, first, the application managing unit 11 extracts the application ID corresponding to the content ID included in the terminal state information on the basis of the priority table 54 and sets the application of the extracted application ID as a transmission candidate application. For example, when the content ID of the electronic book content executed in the terminal 20 is Content 1, the application IDs corresponding to Content 1 are "1" to "6" with reference to the priority table 54 shown in FIG. 12, and Applications 1 to 6 are transmission candidate applications.

Then, the application managing unit 11 calculates the distance between the location of the terminal 20 and the reference position of each application on the basis of reference latitudes and reference longitudes of Applications 1 to 6 and the latitude and the longitude represented by the latitude and longitude information included in the terminal state information. In this example, the terminal 20 moves to the region described in the tour guidebook as Content 1, that is, an electronic book content, executed in the terminal 20, and thus the calculation result is less than 10 km.

For example, when the distance between a major facility and the terminal 20 determined by Content 1 and the applications is "0.5 km" for Application 1, "1.5 km" for Application 2, "5.5 km" for Application 3, "5.0 km" for Application 4, "3.0 km" for Application 5, and "3.0 km" for Application 6, the display priority is "5" for Application 1, "4" for Application 2, "3" for Application 3, "0" for Application 4, "2" for Application 5, and "1" for Application 6 with reference to the priority column 547 of the priority table 54 shown in FIG. 12.

The application managing unit 11 determines applications to be transmitted on the basis of the determined priority and the simultaneously-displayable application number column 523 of the execution capability table 55. The value of the simultaneously-displayable application number column 523 in the execution capability table 55 shown in FIG. 13 is "3", and the application managing unit 11 determines three applications from the application having the highest display priority as the applications to be transmitted. Since the display priority of Application 1 is "5" which is the highest and the display priority is lowered in the order of Application 2 and Application 3, Applications 1 to 3 are determined as the applications to be transmitted.

In sequence S42 after step C11, the application transmitting unit 12 transmits the execution file of the application with the application ID of "1" and the display priority "5" corresponding to the application ID of "1" to the terminal 20 through the server communication unit 18. Subsequently, in sequence S43, the application transmitting unit 12 transmits the execution file of the application with the application ID of "2" and the priority "4" corresponding to the application ID of "2" to the terminal 20 through the server communication unit 18. Subsequently, in sequence S44, the application transmitting unit 12 transmits the execution file of the application with the application ID of "3" and the priority "4" corresponding to the application ID of "3" to the terminal 20 through the server communication unit 18, and ends the short-distance application distributing process. The application transmitting unit 12 stores the application IDs of the transmitted applications and the priorities thereof in the server storage unit 17 in correlation with each other.

Steps D11 to D13 are the same as steps D1, D4, and D5 shown in FIG. 16, Sequence S41 is the same as sequence S33 shown in FIG. 16, and description thereof will be omitted to avoid repetition. In a sequence subsequent to sequence S33, the application receiving unit 21 sequentially receives an application and the priority of the application from the distribution server 10 through the terminal communication unit 26. For example, when three applications are sequentially transmitted from the distribution server 10, the application receiving unit 21 first receives the execution file of the application with the application ID of "1" and the priority "5" corresponding to the application ID of "1" from the distribution server 10 through the terminal communication unit 26 in sequence S42.

In step D14, the installing unit 28 and the application executing unit 29 perform an application receiving process. Specifically, since the number of simultaneously-displayable applications represented by the application control information stored in the terminal storage unit 27 is "3" and any application is not yet executed, the received applications can be displayed and the installing unit 28 installs the received application with the application ID of "1". The application executing unit 29 executes the installed application and displays the information created by the application with the application ID of "1" in the first application display area 77 of the second electronic book reader screen 75 shown in FIG. 15.

In sequence S43 after step D14, the application receiving unit 21 receives the execution file of the application with the application ID of "2" and the priority "4" corresponding to the application ID of "2" from the distribution server 10 through the terminal communication unit 26.

In step D15, the installing unit 28 and the application executing unit 29 perform an application receiving process. Specifically, since the number of simultaneously-displayable applications represented by the application control information stored in the terminal storage unit 27 is "3" and only one application is executed, the received applications can be displayed and the installing unit 28 installs the received application with the application ID of "2". The application executing unit 29 executes the installed application with the application ID of "2". Since the priority "4" corresponding to the application ID of "2" is lower than the priority "5" corresponding to the application ID of "1" of the executed application, the information created by the application with the application ID of "2" is displayed in the second application display area 78 of the second electronic book reader screen 75 shown in FIG. 15.

In sequence S44 after step D15, the application receiving unit 21 receives the execution file of the application with the application ID of "3" and the priority "3" corresponding to the application ID of "3" from the distribution server 10 through the terminal communication unit 26.

In step D16, the installing unit 28 and the application executing unit 29 perform an application receiving process. Specifically, since the number of simultaneously-displayable applications represented by the application control information stored in the terminal storage unit 27 is "3" and only two applications are executed, the received applications can be displayed and the installing unit 28 installs the received application with the application ID of "3". The application executing unit 29 executes the installed application with the application ID of "3". Since the priority "3" corresponding to the application ID of "3" is lower than the priority "5" corresponding to the application ID of "1" of the executed application and the priority "4" corresponding to the application ID of "2", the information created by the application with the application ID of "3" is displayed in the third application display area 79 of the third electronic book reader screen 75 shown in FIG. 15. The application receiving unit 21 stores the application IDs and the priority records of the received applications in the terminal storage unit 27.

Therefore, hitherto, Application 1 is displayed in the first application display area 77, Application 2 is displayed in the second application display area 78, Application 3 is displayed in the third application display area 79, and Content 1 is displayed in the electronic book content display area 76.

Figure 18:
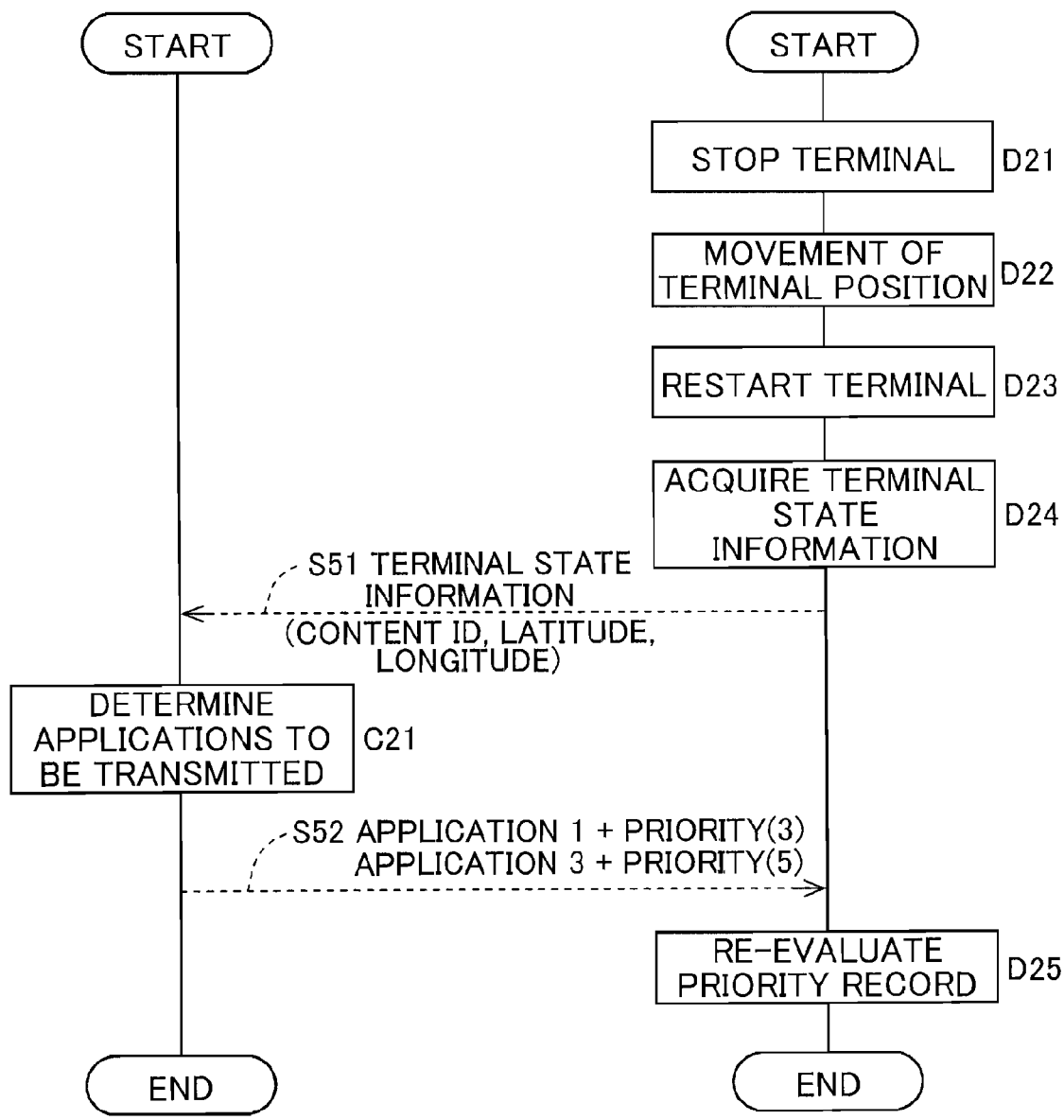
FIG. 18 is a sequence diagram illustrating the process flow of a short-distance application re-distributing process performed by the distribution server and the terminal.

FIG. 18 is a sequence diagram illustrating the process flow of a short-distance application re-distributing process performed by the distribution server 10 and the terminal 20. The left process flow in FIG. 18 shows a process flow of a short-distance application re-distributing process performed by the server CPU and the right process flow shows a process flow of a short-distance application re-executing process performed by the terminal CPU. When the terminal state receiving unit 14 receives the terminal state information through the server communication unit 18 in sequence S41, the process flow goes to step C21. When a user turns off the terminal in the final state of FIG. 17, the process flow goes to step D21.

In step C21, the application managing unit 11 determines applications to be transmitted. Specifically, the application managing unit 11 determines applications and priorities to be transmitted to the terminal 20, which has transmitted the terminal state information received by the server communication unit 18, on the basis of the execution capability information and the terminal state information received from the terminal 20 by the server communication unit 18. In a sequence subsequent to step C21, the application transmitting unit 12 sequentially transmits the applications and the priorities determined by the application managing unit 11, that is, priority information, to the terminal 20 through the server communication unit 18 in the ascending order of the application IDs, and ends the short-distance application re-distributing process.

More specifically, first, the application managing unit 11 extracts the application ID corresponding to the content ID included in the terminal state information on the basis of the priority table 54 and sets the application of the extracted application ID as a transmission candidate application. For example, when the content ID of the electronic book content displayed in the terminal 20 is Content 1, the application IDs corresponding to Content 1 are "1" to "6" with reference to the priority table 54 shown in FIG. 12 and Applications 1 to 6 are transmission candidate applications.

Then, the application managing unit 11 calculates the distance between the location of the terminal 20 and the reference position of each application on the basis of reference latitudes and reference longitudes of Applications 1 to 6 and the latitude and the longitude represented by the latitude and longitude information included in the terminal state information. In this example, it is assumed that the terminal 20 moves to the region described in Content 1, that is, the tour guidebook as an electronic book content, executed in the terminal 20 from the position described with reference to FIG. 17.

For example, when the distance between a major facility and the terminal 20 determined by Content 1 and the applications is "5.5 km" for Application 1, "1.5 km" for Application 2, "0.5 km" for Application 3, "5.0 km" for Application 4, "3.0 km" for Application 5, and "3.0 km" for Application 6, the display priority is "3" for Application 1, "4" for Application 2, "5" for Application 3, "0" for Application 4, "2" for Application 5, and "1" for Application 6 with reference to the priority table 54 shown in FIG. 12.

The application managing unit 11 determines applications to be transmitted on the basis of the determined priority and the simultaneously-displayable application number column 523 of the execution capability table 55. The value of the simultaneously-displayable application number column 523 in the execution capability table 55 shown in FIG. 13 is "3", and the application managing unit 11 determines three applications from the application having the highest display priority as the applications to be transmitted. Since the display priority of Application 3 is "5" which is the highest and the display priority is lowered in the order of Application 2 and Application 1, Applications 1 to 3 are determined as the applications to be transmitted.

In sequence S52 after step C21, the application transmitting unit 12 transmits information different from the previously-transmitted applications and priorities to the terminal 20 through the server communication unit 18. Since the application IDs of the previously-transmitted applications, for example, the application IDs "1" to "3" and the priorities of Applications 1 to 3, are stored in the terminal storage unit 27, the execution files of Applications 1 to 3 are not transmitted. However, since the display priority of Application 1 is changed from "5" to "3" and the display priority of Application 3 is changed from "3" to "5", the application transmitting unit 12 transmits the application IDs of the applications of which the display priority is changed and the changed display priorities. In this example, since the display priorities of Applications 1 and 3 are changed, the application ID "1" of Application 1 and the changed display priority "3" thereof and the application ID "3" of Application 3 and the changed display priority "5" thereof are transmitted to the terminal 20 through the server communication unit 18. The application transmitting unit 12 updates the priorities stored in the server storage unit 17 with the changed priorities and stores the updated priorities.

In step D21, a user operates a power button of the terminal 20 or the like to stop the terminal 20. At this time, the application executing unit 29 saves the applications being presently executed, the content state being presently displayed, or the position information of the terminal 20 so as to restore the state before it is stopped when the terminal 20 is started up again. In step D22, the user with the terminal 20 moves to the region described in Content 1.

In step D23, the user operates the power button of the terminal 20 or the like to restart the terminal 20. At this time, the application executing unit 29 restores the state of the terminal 20 before it is stopped on the basis of the information stored in step D21. This is based on the related art. The application executing unit 29 performs the process of step D24 of re-transmitting the position information of the terminal 20 to the distribution server 20 when the terminal 20 is restarted.

Step D24 is the same as step D5 shown in FIG. 16, sequence S51 is the same as sequence S33 shown in FIG. 16, and description thereof will be omitted to avoid repetition. In a sequence subsequent to sequence S51, the application receiving unit 21 receives applications and the priorities changed due to the movement from the distribution server 10 through the terminal communication unit 26. For example, in sequence S52, the application receiving unit 21 receives the priorities changed due to the movement along with the application IDs of the corresponding applications. In this example, the application receiving unit 21 receives the application ID of "1" and the priority "3" thereof and the application ID of "3" and the priority "5" thereof from the distribution server 10 through the terminal communication unit 26.

In step D25, the installing unit 28 and the application executing unit 29 re-evaluate the priority records and end the short-distance application re-executing process. Specifically, the installing unit 28 does not perform the installation, because the installed applications are not changed. Since the received priorities represent that the priority of Application 1 is changed from "5" to "3" and the priority of Application 3 is changed from "3" to "5", the application executing unit 29 changes the display of the information created by the application with the application ID of "1" from the first application display area 77 of the second electronic book reader screen 75 shown in FIG. 15 to the third application display area 79 and changes the display of the information created by the application with the application ID of "3" from the third application display area 79 to the first application display area 77.

Therefore, hitherto, Application 1 is displayed in the third application display area 79, Application 2 is displayed in the second application display area 78, Application 3 is displayed in the first application display area 77, and Content 1 is displayed in the electronic book content display area 76.

Here, the terminal 20 is assumed to be stopped in operation when the position of the terminal moves, but the terminal 20 may move while operating. In this case, the application executing unit 29 can acquire the latitude and longitude of the terminal 20 from the terminal state acquiring unit 33 at a predetermined time interval, for example, 10 seconds and may periodically perform the process of step D24. The position information of the terminal 20 is frequently transmitted to the distribution server 10 by sequence S51 and the application ID and the priority are received on the basis of the determination of the distribution server 10 by sequence S52. Accordingly, the displayed application is updated every time.

In this way, the server storage unit 17 stores plural application programs and priority information representing priorities for controlling the application programs in correlation with each other. The application managing unit 11 determines the application program to be transmitted to the terminal 20. The application transmitting unit 12 reads the application program determined by the application managing unit 11 and the priority information correlated with the determined application program from the server storage unit 17 and transmits the read application program and the read priority information to the terminal 20. Accordingly, it is possible to control execution of the plural applications distributed from the distribution server 10 to the terminal 20 on the basis of the priority information transmitted from the distribution server 10.

Further, the terminal state receiving unit 14 receives terminal state information representing the state of the terminal 20 from the terminal 20. The application managing unit 11 determines the application program to be transmitted to the terminal 20 on the basis of the terminal state information received by the terminal state receiving unit 14. Accordingly, it is possible to change the application program to be transmitted to the terminal 20 depending on the state of the terminal 20.

Further, the terminal capability receiving unit 13 receives terminal capability information representing the number of applications, which can be controlled by the terminal 20, from the terminal 20. The application managing unit 11 determines the application program to be transmitted to the terminal 20 on the basis of the terminal capability information received by the terminal capability receiving unit 13. Accordingly, it is possible to change the application program to be transmitted to the terminal 20 depending on the number of applications which can be controlled by the terminal 20.

Further, the priority changing unit 15 changes the priorities represented by the priority information stored in the server storage unit 17. The priority re-transmitting unit 16 transmits the priority information changed by the priority changing unit 15 to the terminal 20. Accordingly, it is possible to change the priority information transmitted to the terminal 20 from the distribution server 10.

Further, since the priorities represented by the priority information stored in the server storage unit 17 are priorities for installing the application programs, it is possible to control the order of priorities for installing the applications in the terminal 20 from the distribution server 10.

Further, since the priorities represented by the priority information stored in the server storage unit 17 are priorities for executing the application programs, it is possible to control the order of priorities for executing the applications in the terminal 20 from the distribution server 10.

Further, since the priorities represented by the priority information stored in the server storage unit 17 are priorities for displaying image information generated by the application programs, it is possible to control the order of priorities for displaying the image information generated by the applications in the terminal 20 from the distribution server 10.

Further, since the priorities represented by the priority information stored in the server storage unit 17 are priorities for outputting audio information generated by the application programs, it is possible to control the order of priorities for outputting the audio information generated by the applications in the terminal 20 from the distribution server 10.

Further, the terminal 20 includes an input unit 30 configured so that instruction information representing an instruction provided to an application program by a user is inputted. The priorities represented by the priority information stored in the server storage unit 17 are priorities for assigning the input unit 30 to the application programs. Accordingly, it is possible to control the order of priorities for assigning the input unit 30 to the application programs in the terminal 20 from the distribution server 10.

Further, since the priorities represented by the priority information stored in the server storage unit 17 are priorities of communications performed by the application programs, it is possible to control the order of priorities for communications performed by the applications in the terminal 20 from the distribution server 10.

Further, the application receiving unit 21 receives an application program and priority information representing the priority for controlling the application program from distribution server 10. The installing unit 28 and the application executing unit 29 control the application program received by the application receiving unit 21 on the basis of the priority represented by the priority information received by the application receiving unit 21. Accordingly, it is possible to control the execution of the plural applications distributed from the distribution server 10 to the terminal 20 on the basis of the priority information transmitted from the distribution server 10.

Further, the terminal state transmitting unit 24 transmits terminal state information representing the state of the terminal 20 to the distribution server 10. Accordingly, it is possible to change the application program transmitted to the terminal 20 depending on the state of the terminal 20.

Further, the terminal capability transmitting unit 23 transmits terminal capability information representing the number of applications which can be controlled by the terminal 20. Accordingly, it is possible to change the application program transmitted to the terminal 20 depending on the number of applications which can be controlled by the terminal 20.

Further, the priority re-receiving unit 25 receives changed priority information from the distribution server 10 after receiving the application program and the priority information through the application receiving unit 21. The installing unit 28 and the application executing unit 29 control the application program received by the application receiving unit 21 depending on the priority represented by the priority information received by the priority re-receiving unit 25. Accordingly, it is possible to change the priority information transmitted to the terminal 20 from the distribution server 10.

Further, since the installing unit 28 controls installing an application program and uninstalling an installed application program on the basis of the priority represented by the received priority information, it is possible to control the order of priority for installing an application in the terminal 20 from the distribution server 10.

Further, since the application executing unit 29 controls starting and ending the execution of the application program on the basis of the priority represented by the received priority information, it is possible to control the order of priority for executing the application in the terminal 20 from the distribution server 10.

Further, since the application executing unit 29 determines whether image information generated by the application program is displayed on the basis of the priority represented by the received priority information or not, it is possible to control the order of priority for displaying the image information generated by an application in the terminal 20 from the distribution server 10.

Further, since the application executing unit 29 controls a display position and a display size of image information generated by the application program on the basis of the priority represented by the received priority information, it is possible to control the display position and the display size of the image information generated by the application in the terminal 20 from the distribution server 10.

Further, since the application executing unit 29 controls an output of audio information generated by the application program on the basis of the priority represented by the received priority information, it is possible to control the order of priority for outputting audio information generated by the application in the terminal 20 from the distribution server 10.

Further, through the input unit 30, instruction information representing an instruction provided to the application program by a user is inputted. The application executing unit 29 controls assigning the input unit 30 to the application program on the basis of the priority represented by the received priority information. Accordingly, it is possible to control the order of priority for assigning the input unit 30 to the application program in the terminal 20 from the distribution server 10.

Further, since the application executing unit 29 controls communication of the application program on the basis of the priority represented by the received priority information, it is possible to control the order of priority for communication of the application in the terminal 20 from the distribution server 10.

Further, the screen display unit 31 displays a video content, for example, image information of television broadcasts. The terminal state information is identification information for identifying the video content displayed on the screen display unit 31, for example, channel number information. Accordingly, it is possible to receive an application program from the distribution server 10 depending on the video content displayed in the terminal 20.

Further, since the application control system includes the distribution server 10 and the terminal 20, it is possible to control the execution of plural applications distributed from the distribution server 10 to the terminal 20 on the basis of the priority information transmitted from the distribution server 10.

Further, the terminal state information includes the content ID for identifying a content including document information displayed in the terminal 20 and the latitude and longitude information representing the position of the terminal 20. The application managing unit 11 determines an application program to be transmitted to the terminal 20 on the basis of the content including the document information which is identified by the content ID included in the terminal state information received by the terminal state receiving unit 14 and the position represented by the latitude and longitude information included in the terminal state information received by the terminal state receiving unit 14. Accordingly, the distribution server 10 can distribute applications to the terminal 20 on the basis of the content displayed in the terminal 20 and the position of the terminal 20, and it is thus possible to control the execution of plural applications distributed from the distribution server 10 to the terminal 20 on the basis of the priority information transmitted from the distribution server 10.

Further, the screen display unit 31 displays a content including document information. The terminal state acquiring unit 33 detects the position of the terminal 20. The terminal state information includes the content ID for identifying the content displayed on the screen display unit 31 and the latitude and longitude information representing the position detected by the terminal state acquiring unit 33. Accordingly, the terminal 20 can distribute an application to the distribution server 10 on the basis of the content displayed in the terminal 20 and the position of the terminal 20.

Further, since the application control system includes the distribution server 10 and the terminal 20, the distribution server 10 can distribute an application to the terminal 20 on the basis of the content displayed in the terminal 20 and the position of the terminal 20, and it is thus possible to control the execution of plural applications distributed from the distribution server 10 to the terminal 20 on the basis of the priority information transmitted from the distribution server 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1: Control system
2: Network
10: Distribution server
11: Application managing unit
12: Application transmitting unit
13: Terminal capability receiving unit
14: Terminal state receiving unit
15: Priority changing unit
16: Priority re-transmitting unit
17: Server storage unit
18: Server communication unit
20: Terminal
21: Application receiving unit
22: Application control unit
23: Terminal capability transmitting unit
24: Terminal state transmitting unit
25: Priority re-receiving unit
26: Terminal communication unit
27: Terminal storage unit
28: Installing unit
29: Application executing unit
30: Input unit
31: Screen display unit
32: Audio output unit
33: Terminal state acquiring unit
40: Service providing server

The invention claimed is:

1. A server apparatus comprising:
a storage unit configured so as to store plural application programs and priority information representing priorities for controlling the application programs in correlation with each other;
a determination unit configured so as to determine an application program to be transmitted to a terminal apparatus; and
an application transmitting unit configured so as to read the application program determined by the determination unit and the priority information correlated with the determined application program from the storage unit and to transmit the read application program and the read priority information to the terminal apparatus;
a priority changing unit configured so as to change the priorities represented by the priority information stored in the storage unit, wherein the change of the priorities includes altering priority values that are correlated with the application programs; and
a priority transmitting unit configured so as to transmit the priority information changed by the priority changing unit to the terminal apparatus,
wherein the application transmitting unit is configured so as to cause the storage unit to store therein identification information of the transmitted application program for each terminal apparatus,
the priority changing unit is configured so as to change the priorities represented by the priority information stored in the storage unit in correlation with the identification information, and to transmit the identification information of the application program correlated with the priority information in which the priorities have been changed, to the priority transmitting unit, and the priority transmitting unit is configured so as to, when receiving the identification information from the priority changing unit, read the priority information which is correlated with the received identification information and in which the priorities have been changed by the priority changing unit, from the storage unit and to transmit the read priority information together with the identification information, to the terminal apparatus.

2. The server apparatus of claim 1, further comprising a terminal state receiving unit configured so as to receive terminal state information representing a state of the terminal apparatus from the terminal apparatus, wherein the determination unit determines the application program to be transmitted to the terminal apparatus on a basis of the terminal state information received by the terminal state receiving unit.

3. The server apparatus of claim 1, further comprising a terminal capability receiving unit configured so as to receive terminal capability information representing a number of applications which can be controlled by the terminal apparatus, from the terminal apparatus, wherein the determination unit determines the application program to be transmitted to the terminal apparatus on a basis of the terminal capability information received by the terminal capability receiving unit.

4. The server apparatus of claim 1, wherein the priorities represented by the priority information stored in the storage unit are priorities for installing the application programs.

5. The server apparatus of claim 1, wherein the priorities represented by the priority information stored in the storage unit are priorities for executing the application programs.

6. The server apparatus of claim 1, wherein the priorities represented by the priority information stored in the storage unit are priorities for displaying image information generated by the application programs.

7. The server apparatus of claim 1, wherein the priorities represented by the priority information stored in the storage unit are priorities for outputting audio information generated by the application programs.

8. The server apparatus of claim 1, wherein the terminal apparatus includes an input unit configured so that instruction information representing an instruction provided to an application program by a user is inputted, and the priorities represented by the priority information stored in the storage unit are priorities for assigning the input unit to the application programs.

9. The server apparatus of claim 1, wherein the priorities represented by the priority information stored in the storage unit are priorities of communications performed by the application programs.

10. The server apparatus of claim 2, wherein the terminal state information includes identification information for identifying a content including document information displayed in the terminal apparatus and position information representing a position of the terminal apparatus, and the determination unit determines an application program to be transmitted to the terminal apparatus on a basis of the content including the document information which is identified by the identification information included in the terminal state information received by the terminal state receiving unit and the position represented by the position information included in the terminal state information received by the terminal state receiving unit.

11. A terminal apparatus comprising:

an application receiving unit configured so as to receive an application program and priority information representing a priority for controlling the application program from a server apparatus;

a priority receiving unit configured so as to receive changed priority information and identification information from the server apparatus after receiving the application programs and the priority information through the application receiving unit, wherein the changed priority information includes altered priority values that are correlated with the application programs, and a control unit configured so as to control the application program received by the application receiving unit on a basis of the priority represented by the priority information received by the application receiving unit, the control unit being configured so as to, when the priority receiving unit receives the changed priority information from the server apparatus, control the application program received by the application receiving unit depending on the priority represented by the changed priority information received by the priority receiving unit, wherein the application receiving unit is configured so as to cause a terminal storage unit to store the application program and the priority information which are transmitted from the server apparatus, in correlation with each other, and the priority receiving unit is configured so as to, among pieces of the priority information stored in the terminal storage unit, update the priority information correlated with the application program correlated with the received identification information by the changed priority information received.

12. The terminal apparatus of claim 11, further comprising a terminal state transmitting unit configured so as to transmit terminal state information representing a state of the terminal apparatus to the server apparatus.

13. The terminal apparatus of claim 11, further comprising a terminal capability transmitting unit configured so as to transmit terminal capability information representing a number of applications which can be controlled by the terminal apparatus.

14. The terminal apparatus of claim 11, wherein the control unit controls installing an application program and uninstalling an installed application program on a basis of the priority represented by the received priority information.

15. The terminal apparatus of claim 11, wherein the control unit controls starting and ending of execution of the application program on a basis of the priority represented by the received priority information.

16. The terminal apparatus of claim 11, wherein the control unit determines whether image information generated by the application program is displayed on a basis of the priority represented by the received priority information or not.

17. The terminal apparatus of claim 11, wherein the control unit controls a display position and a display size of image information generated by the application program on a basis of the priority represented by the received priority information.

18. The terminal apparatus of claim 11, wherein the control unit controls an output of audio information generated by the application program on a basis of the priority represented by the received priority information.

19. The terminal apparatus of claim 11, further comprising an input unit configured so that instruction information representing an instruction provided to the application program by a user is inputted, wherein the control unit controls assigning the input unit to the application program on a basis of the priority represented by the received priority information.

20. The terminal apparatus of claim 11, wherein the control unit controls communication of the application program on a basis of the priority represented by the received priority information.

21. The terminal apparatus of claim 12, further comprising a display unit configured so as to display a video content,
wherein the terminal state information is identification information for identifying the video content displayed on the display unit.

22. The terminal apparatus of claim 12, further comprising:
a display unit configured so as to displays a content including document information; and
a position detecting unit configured so as to detect the position of the terminal apparatus,
wherein the terminal state information includes identification information for identifying the content displayed on the display unit and position information representing the position detected by the position detecting unit.

23. An application control system comprising:
a server apparatus including:
a storage unit configured so as to store plural application programs and priority information representing priorities for controlling the application programs in correlation with each other;
a determination unit configured so as to determine an application program to be transmitted to a terminal apparatus; and
an application transmitting unit configured so as to read the application program determined by the determination unit and the priority information correlated with the determined application program from the storage unit and to transmit the read application program and the read priority information to the terminal apparatus;
a priority changing unit configured so as to change the priorities represented by the priority information stored in the storage unit, wherein the change of the priorities includes altering priority values that are correlated with the application programs; and
a priority transmitting unit configured so as to transmit the priority information changed by the priority changing unit to the terminal apparatus,
wherein the application transmitting unit is configured so as to cause the storage unit to store therein identification information of the transmitted application program for each terminal apparatus,
the priority changing unit is configured so as to change the priorities represented by the priority information stored in the storage unit in correlation with the identification information, and to transmit the identification information of the application program correlated with the priority information in which the priorities have been changed, to the priority transmitting unit, and
the priority transmitting unit is configured so as to, when receiving the identification information from the priority changing unit, read the priority information which is correlated with the received identification information and in which the priorities have been changed by the priority changing unit, from the storage unit and to transmit the read priority information together with the identification information, to the terminal apparatus; and
the terminal apparatus of claim 11.

24. An application control system comprising:
a server apparatus including:
a storage unit configured so as to store plural application programs and priority information representing priorities for controlling the application programs in correlation with each other;
a determination unit configured so as to determine an application program to be transmitted to a terminal apparatus; and
an application transmitting unit configured so as to read the application program determined by the determination unit and the priority information correlated with the determined application program from the storage unit and to transmit the read application program and the read priority information to the terminal apparatus;
a priority changing unit configured so as to change the priorities represented by the priority information stored in the storage unit, wherein the change of the priorities includes altering priority values that are correlated with the application programs; and
a priority transmitting unit configured so as to transmit the priority information changed by the priority changing unit to the terminal apparatus,
wherein the application transmitting unit is configured so as to cause the storage unit to store therein identification information of the transmitted application program for each terminal apparatus,
the priority changing unit is configured so as to change the priorities represented by the priority information stored in the storage unit in correlation with the identification information, and to transmit the identification information of the application program correlated with the priority information in which the priorities have been changed, to the priority transmitting unit, and
the priority transmitting unit is configured so as to, when receiving the identification information from the priority changing unit, read the priority information which is correlated with the received identification information and in which the priorities have been changed by the priority changing unit, from the storage unit and to transmit the read priority information together with the identification information, to the terminal apparatus; and
the terminal apparatus of claim 22.

* * * * *